United States Patent
Kim et al.

(10) Patent No.: US 12,336,032 B2
(45) Date of Patent: Jun. 17, 2025

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 17/800,107

(22) PCT Filed: Feb. 18, 2021

(86) PCT No.: PCT/KR2021/002078
§ 371 (c)(1),
(2) Date: Sep. 29, 2022

(87) PCT Pub. No.: WO2021/167376
PCT Pub. Date: Aug. 26, 2021

(65) Prior Publication Data
US 2024/0237098 A1   Jul. 11, 2024

(30) Foreign Application Priority Data

Feb. 18, 2020 (KR) .................. 10-2020-0019958
Feb. 19, 2020 (KR) .................. 10-2020-0020665
Mar. 11, 2020 (KR) .................. 10-2020-0030398

(51) Int. Cl.
H04W 76/15 (2018.01)
H04W 28/08 (2023.01)
H04W 84/12 (2009.01)

(52) U.S. Cl.
CPC ............ H04W 76/15 (2018.02); *H04W 28/08* (2013.01); *H04W 84/12* (2013.01)

(58) Field of Classification Search
None
See application file for complete search history.

(56) References Cited

U.S. PATENT DOCUMENTS

2011/0255401 A1   10/2011   Seok
2013/0077554 A1*  3/2013   Gauvreau .............. H04L 5/001
                                                                370/312

(Continued)

OTHER PUBLICATIONS

Jang, Insun et al., Indication of Multi-link Information, LG Electronics, IEEE 802.11-20/0028r0, Jan. 12, 2020, see slides 1-13.

(Continued)

*Primary Examiner* — Otis L Thompson, Jr.
(74) *Attorney, Agent, or Firm* — BRYAN CAVE LEIGHTON PAISNER LLP

(57) ABSTRACT

According to various embodiments, a multi-link device (MLD) operating in a plurality of links may transmit a first request frame for requesting information on the plurality of links. The multi-link device may receive a first response frame on the basis of the first request frame. The first response frame may include information on a ratio of stations (STAs) using a first link as an anchor link, and information on a ratio of STAs using a second link as an anchor link.

17 Claims, 39 Drawing Sheets

(a)

(b)

(56) References Cited

U.S. PATENT DOCUMENTS

| | | | | |
|---|---|---|---|---|
| 2015/0078298 A1* | 3/2015 | Barriac | ............... | H04W 84/12 |
| | | | | 370/329 |
| 2016/0066349 A1* | 3/2016 | Seok | ............... | H04W 74/0833 |
| | | | | 370/338 |
| 2016/0112944 A1* | 4/2016 | Zhou | ............... | H04W 48/16 |
| | | | | 370/338 |
| 2017/0104570 A1* | 4/2017 | Kim | ............... | H04W 72/0446 |
| 2018/0242384 A1* | 8/2018 | Tian | ............... | H04W 24/02 |
| 2020/0344632 A1* | 10/2020 | Li | ............... | H04W 28/0252 |
| 2021/0007168 A1* | 1/2021 | Asterjadhi | ............... | H04W 52/0235 |
| 2021/0029588 A1* | 1/2021 | Cariou | ............... | H04W 40/244 |
| 2021/0068171 A1* | 3/2021 | Hsu | ............... | H04W 74/002 |
| 2021/0211871 A1* | 7/2021 | Chu | ............... | H04W 12/06 |
| 2021/0212156 A1* | 7/2021 | Kwon | ............... | H04W 76/34 |

OTHER PUBLICATIONS

Patil, Abhishek et al., Multi-link; Link Management, Qualcomm Inc., IEEE 802.11-19/1528r5, Jan. 16, 2020, see slides 1-22.

Min, Alexander et al., Multi-link power save operation, Intel, IEEE 802.11-19/1544r5, Jan. 16, 2020, see slides 1-18.

Patil, Abhishek et al., Multi-Link Operation: Anchor Channel, Qualcomm Inc., IEEE 802.11-19/1526r3, Jan. 16, 2020, see slides 1-11.

* cited by examiner (a)

| Multi-link STA | | |
|---|---|---|
| 5GHz | 6GHz | |
| STA 1 Link 1 | STA 2 Link 2 | STA 3 Link 3 |

TECHNIQUE FOR PERFORMING MULTI-LINK COMMUNICATION IN WIRELESS COMMUNICATION SYSTEM

This application is the National Stage filing under 35 U.S.C. 371 of International Application No. PCT/KR2021/002078 filed on Feb. 18, 2021, which claims priority to Korean Patent Application Nos. 10-2020-0019958 filed on Feb. 18, 2020, 10-2020-0020665 filed on Feb. 19, 2020 and 10-2020-0030398 filed on Mar. 11, 2020, the contents of which are all hereby incorporated by reference herein in their entirety.

BACKGROUND

Field of the Disclosure

The present specification relates to a scheme for performing multi-link communication in a wireless local area network (WLAN) system, and more particularly, to a method for transmitting information on a link in the multi-link communication and an apparatus supporting the method.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In the EHT standard, a wide bandwidth (e.g., 160/320 MHz), 16 streams, and/or a multi-link (or multi-band) operation may be used to support a high throughput and a high data rate.

In the EHT standard, a multi-link may include an anchored link and a non-anchored link. A device supporting the multi-link (i.e., a multi-link device) may designate one or more links among multi-links as an anchor link. The rest of the links may operate as a non-anchor link.

In the anchor link, exchange of a management frame or a control frame may be performed. The anchor link may produce a greater load than the non-anchor link. Therefore, technical features for switching the anchor link may be required for load balancing.

According to various embodiments, a multi-link device (MLD) operating on a plurality of links may perform operations including: transmitting a first request frame to request for information on the plurality of links; and receiving a first response frame, based on the first request frame. The first response frame may include information on a first link and second link operable as an anchored link among the plurality of links. The first response frame may further include information on a ratio of stations (STAs) which use the first link as the anchored link and information on a ratio of STAs which use the second link as the anchored link.

A multi-link device (MLD) may transmit a request frame to request for information on a plurality of links and, based on this, obtain information on the plurality of links. The information on the plurality of links may include information for switching an anchor link. Accordingly, the MLD may request to switch the anchor link, based on the information on the plurality of links.

In addition, when it is difficult to operate the anchor link currently in use, the MLD may request to switch the anchor link. Accordingly, when the current anchor link is not utilized properly, the MLD requests to switch the anchor link, thereby advantageously maintaining a connection with an access point (AP) MLD.

BRIEF DESCRIPTION OF THE DRAWINGS

FIG. 22 illustrates an example of a structure of a non-AP MLD.

DESCRIPTION OF EXEMPLARY EMBODIMENTS

Figure 1:
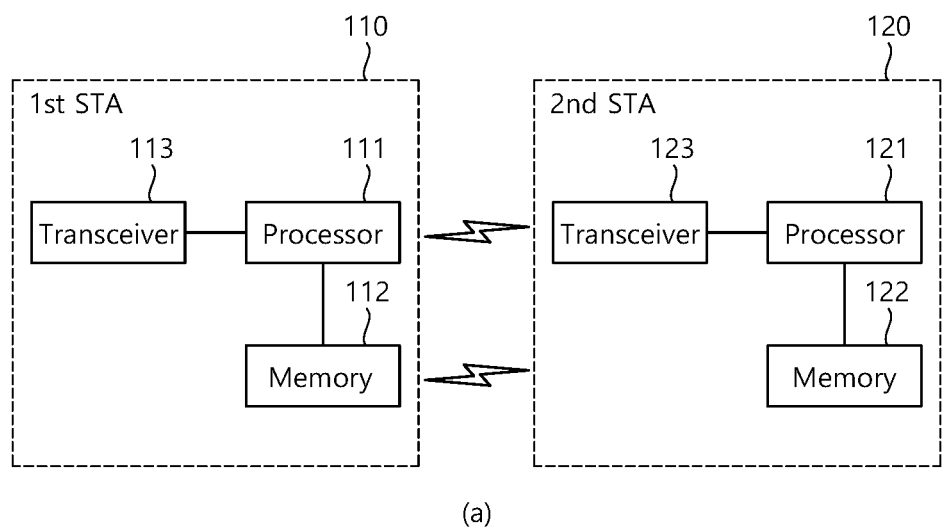
FIG. 1 shows an example of a transmitting apparatus and/or receiving apparatus of the present specification.
Figure 1:
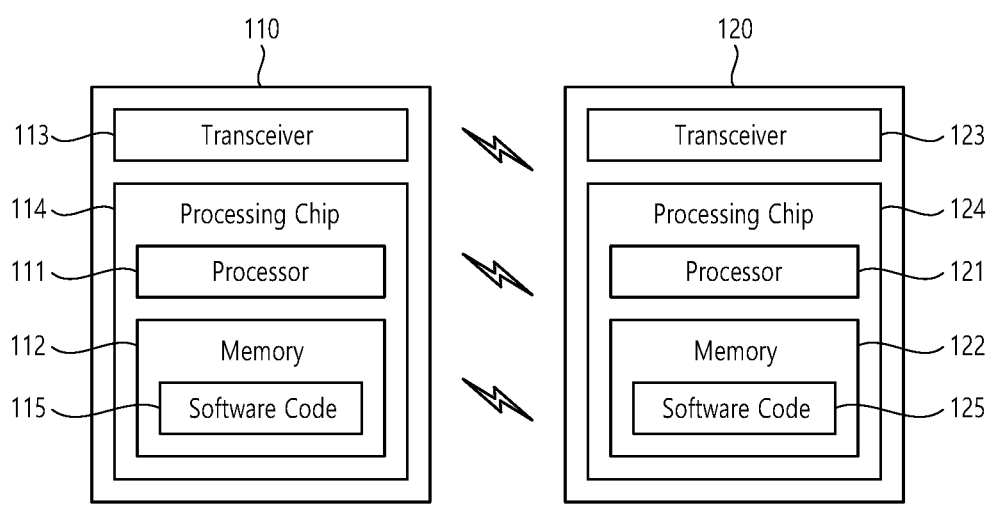

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
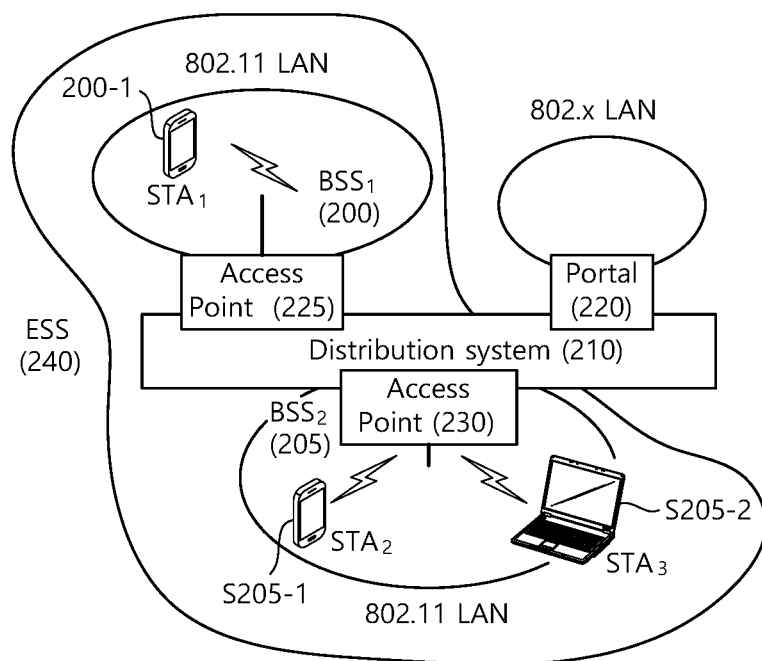
FIG. 2 is a conceptual view illustrating the structure of a wireless local area network (WLAN).
Figure 2:
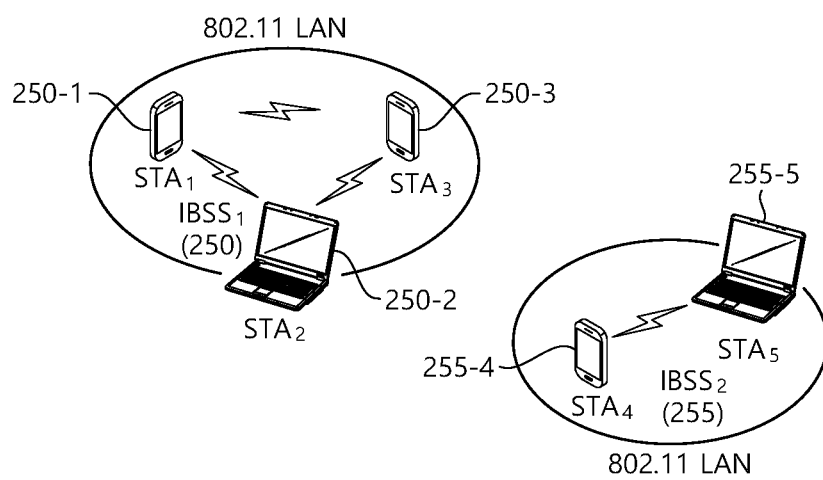

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
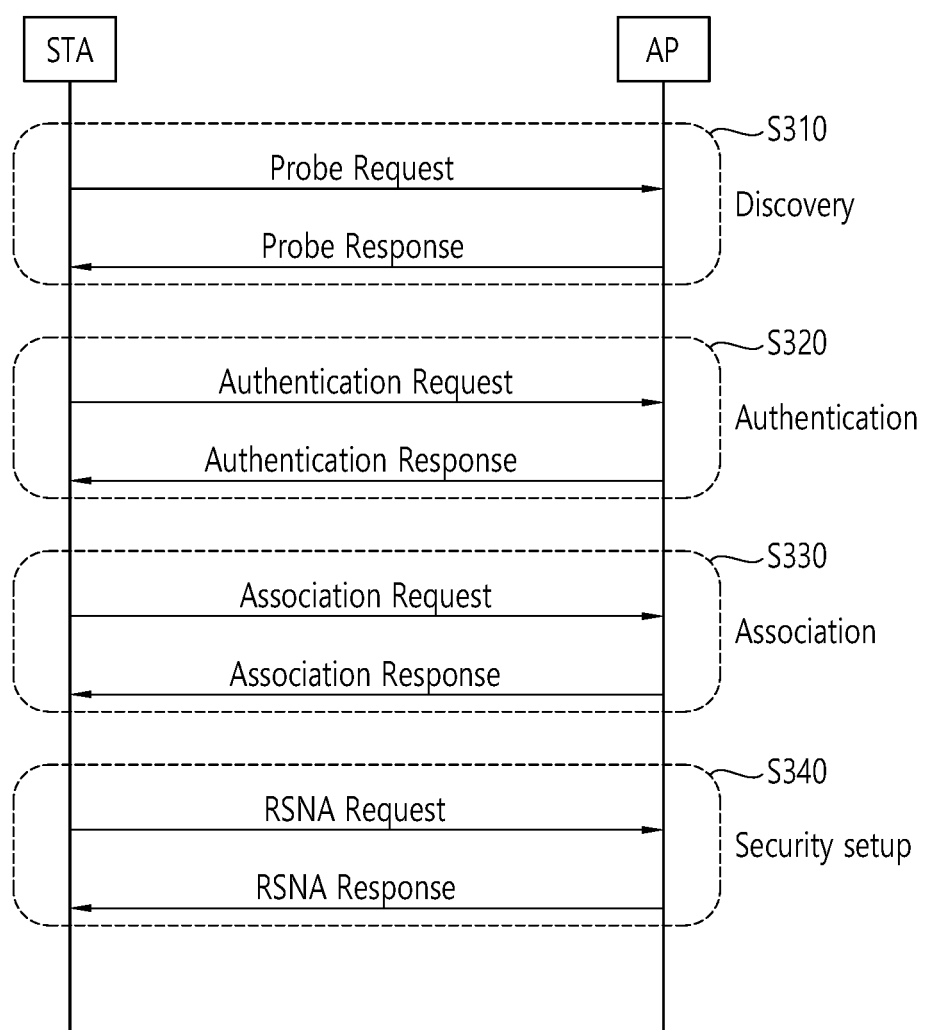
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
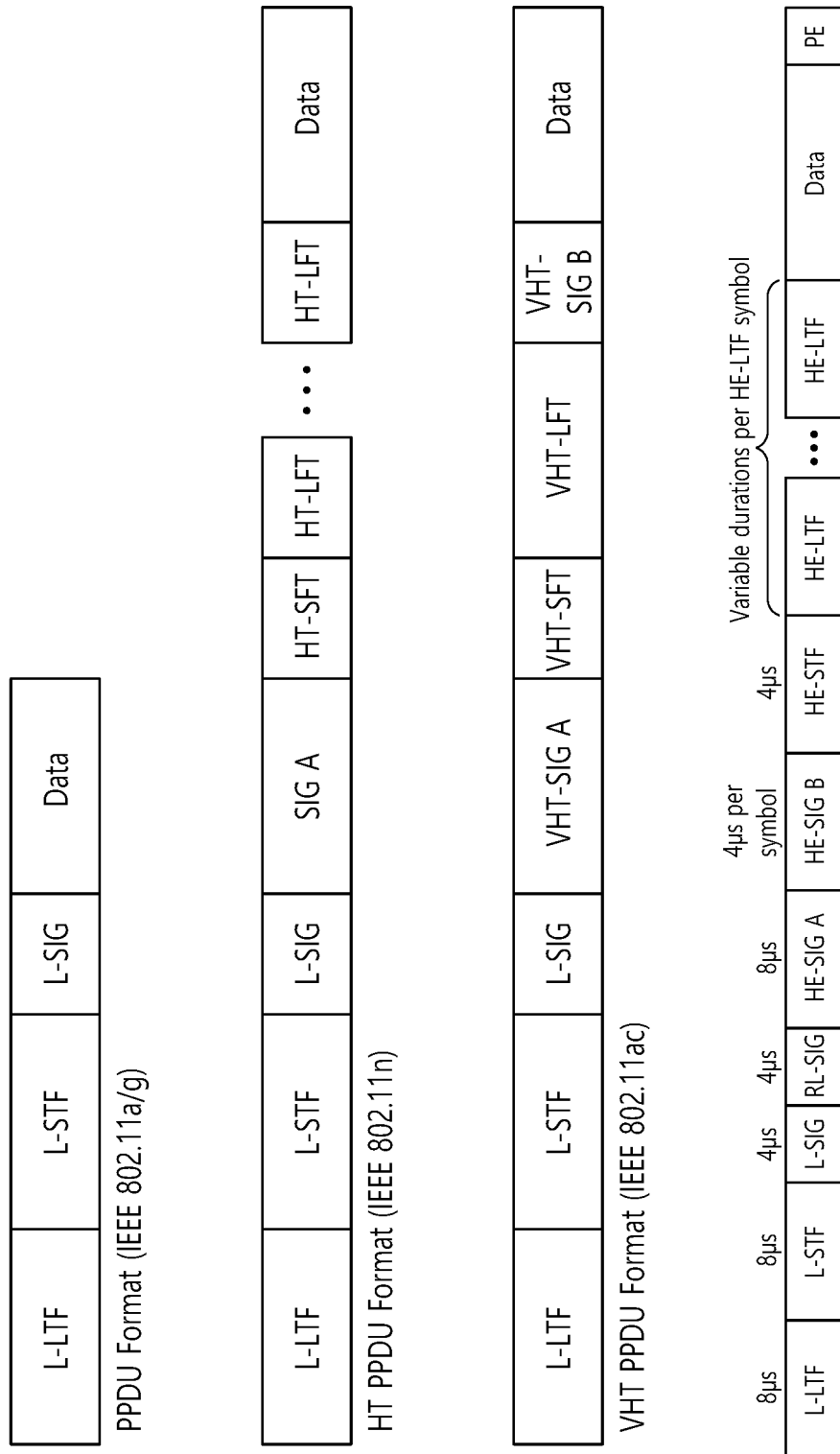
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
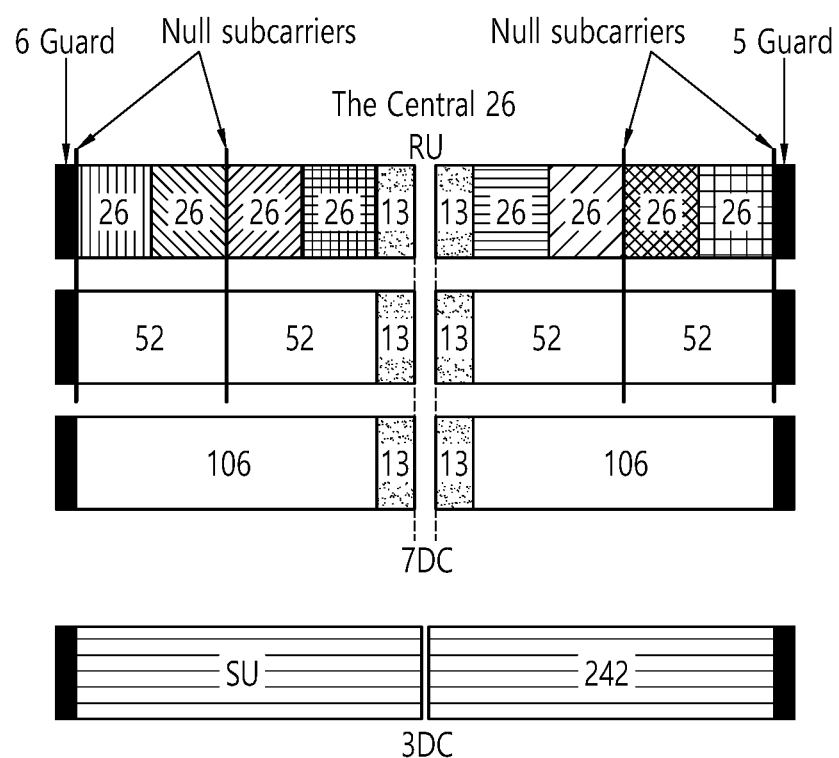
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
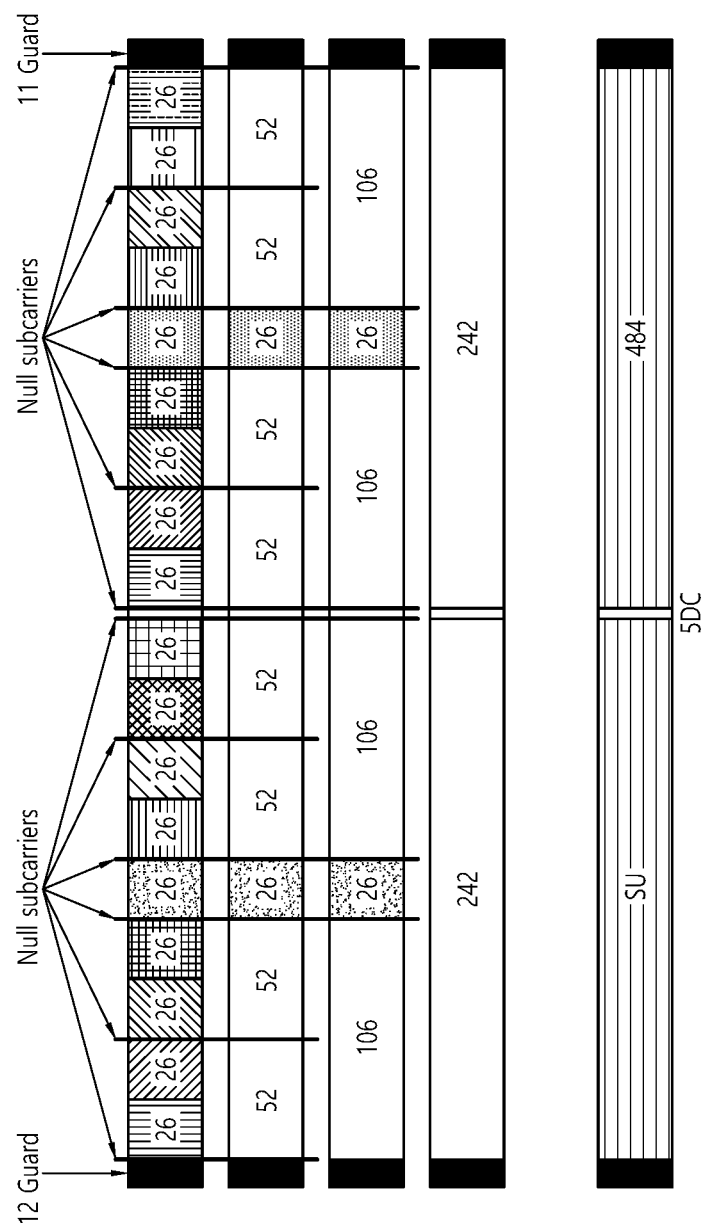
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
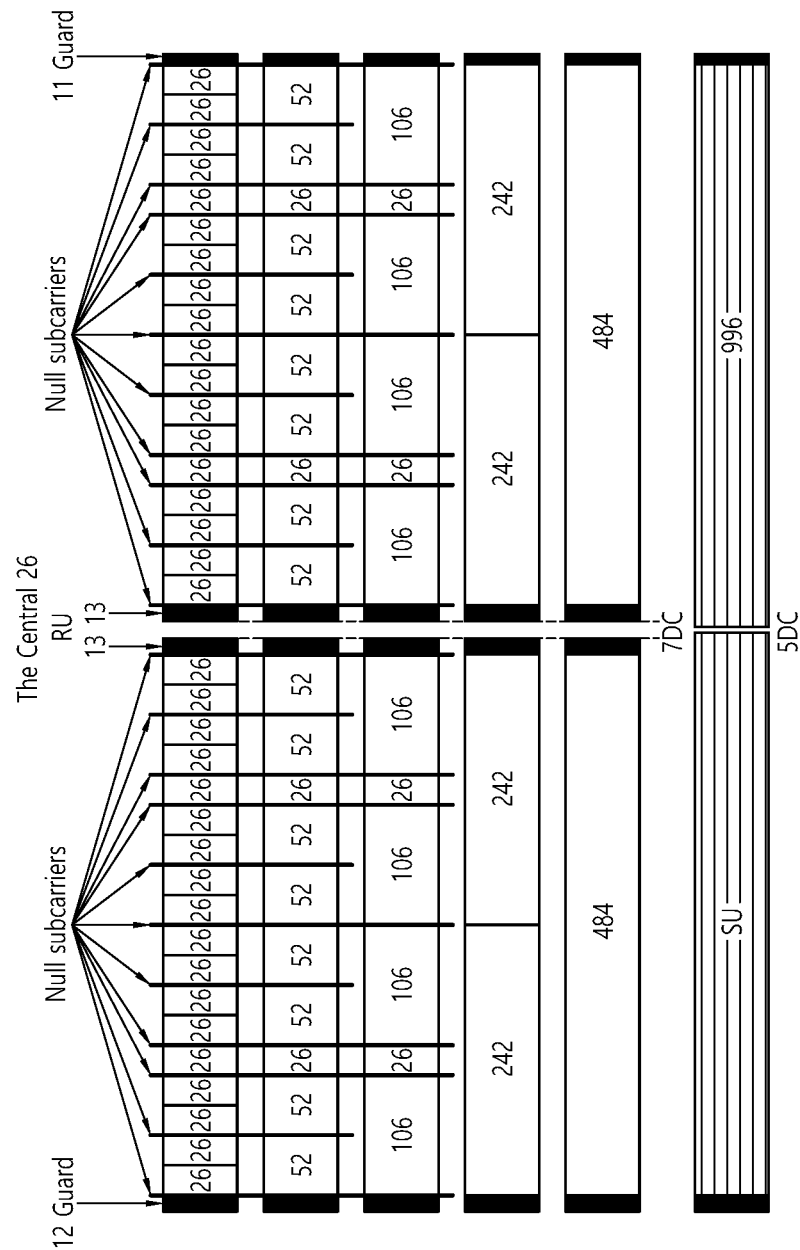
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
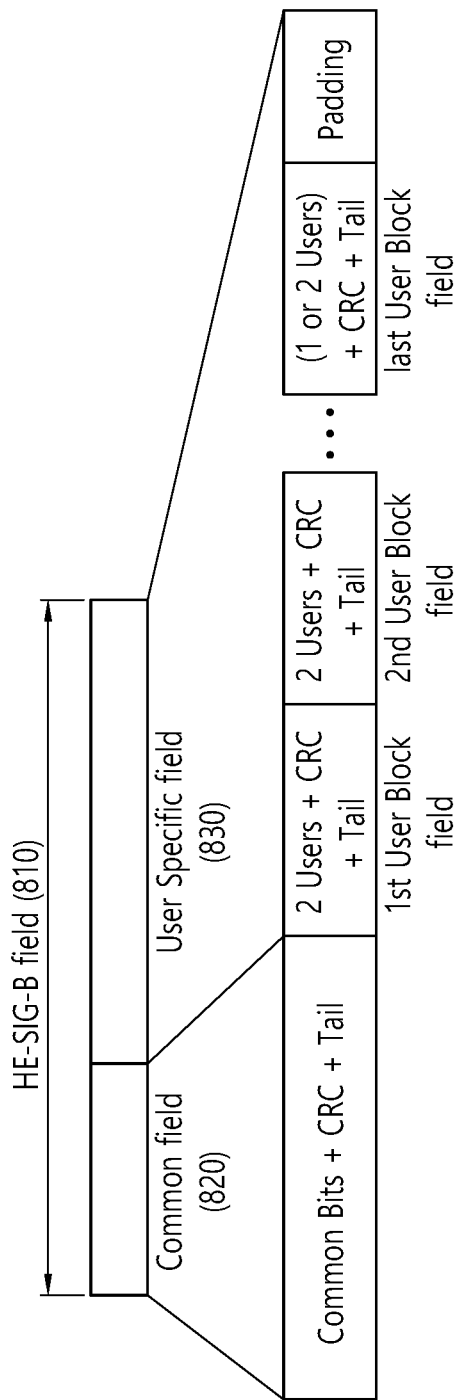
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
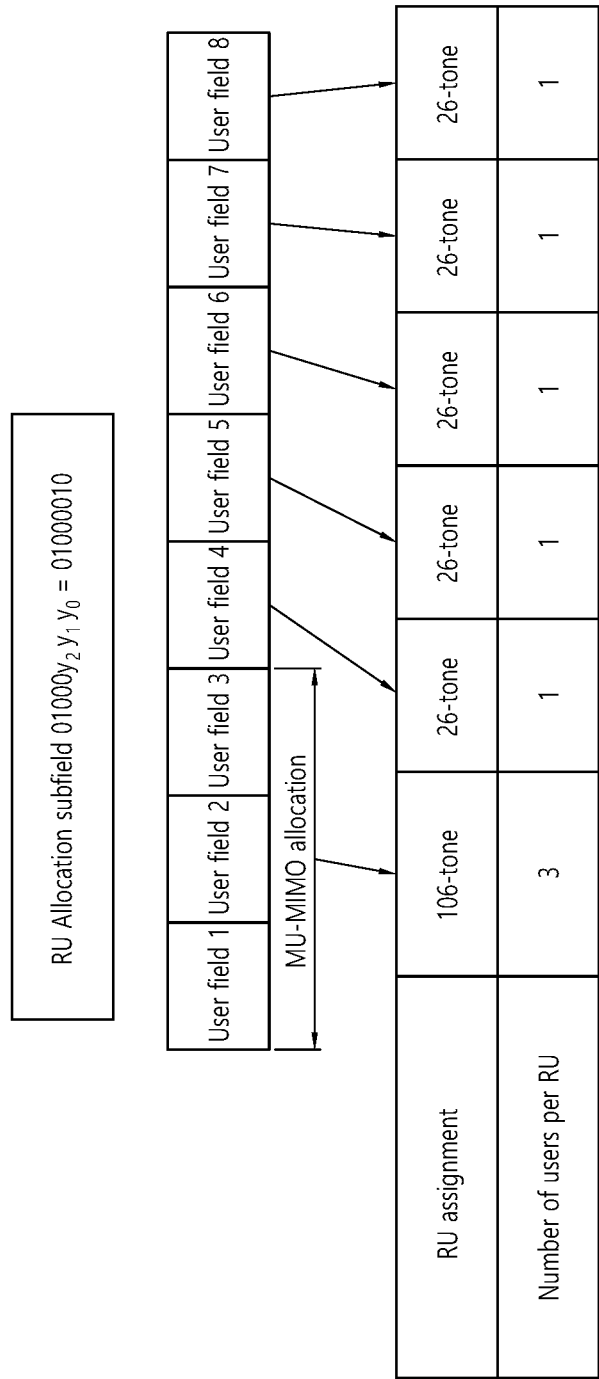
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 7 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
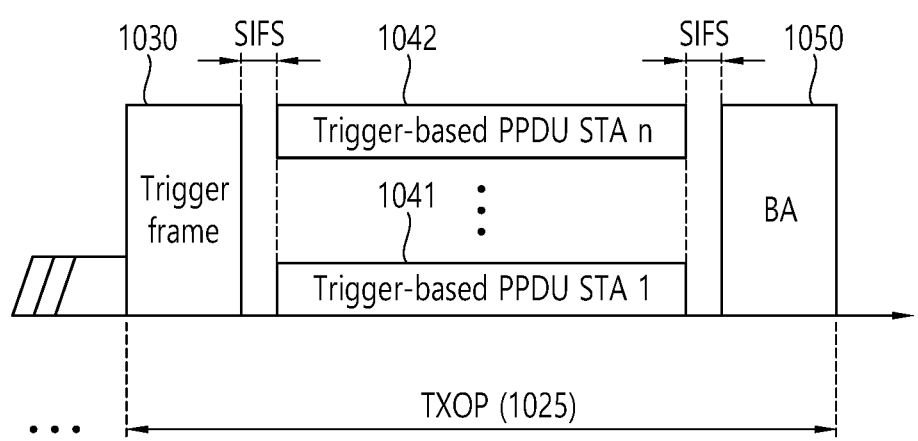
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
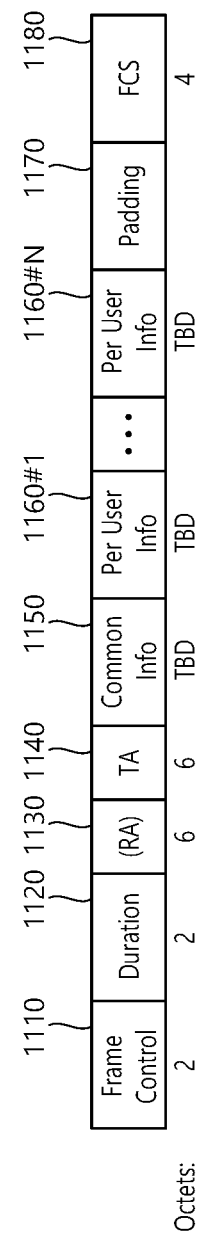
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
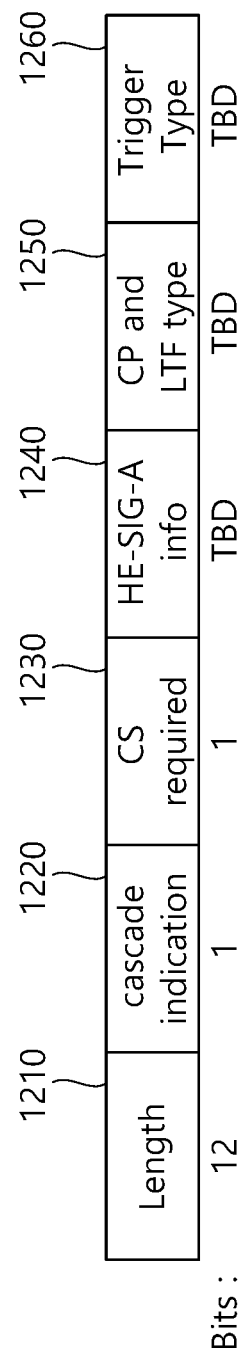
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
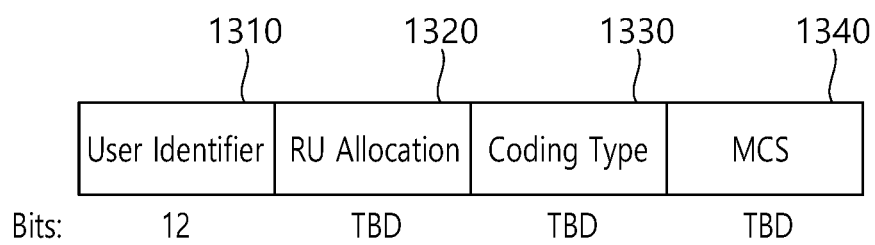
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
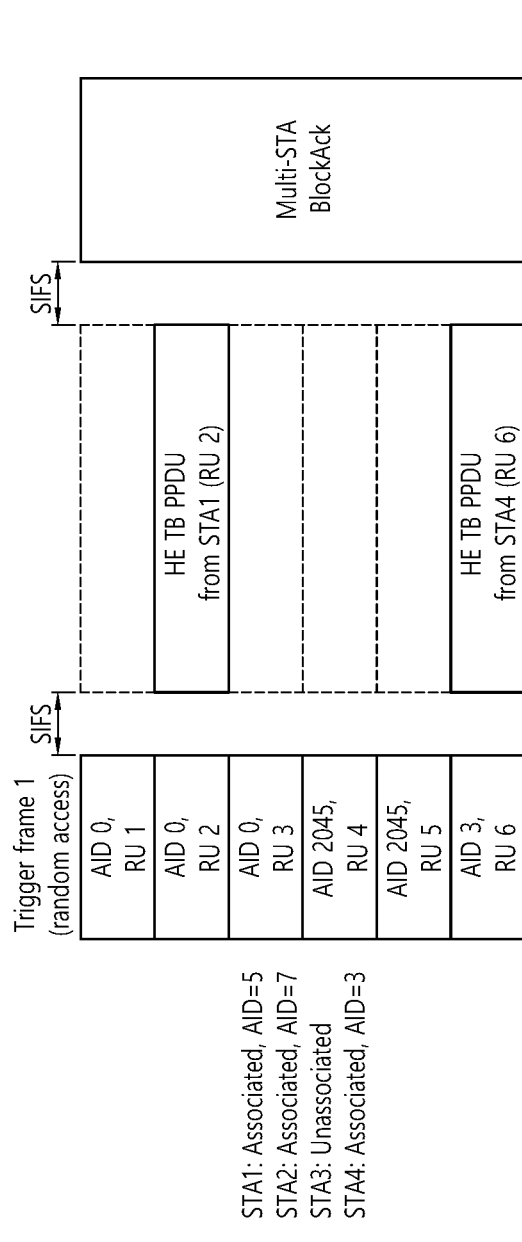
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
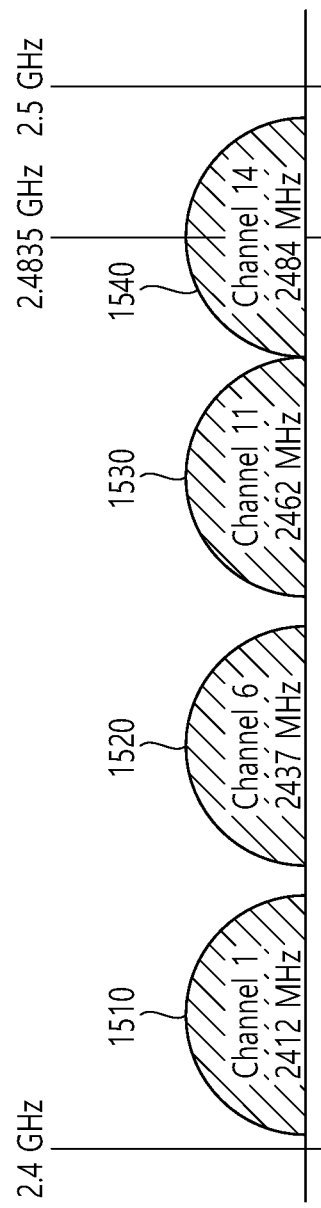
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
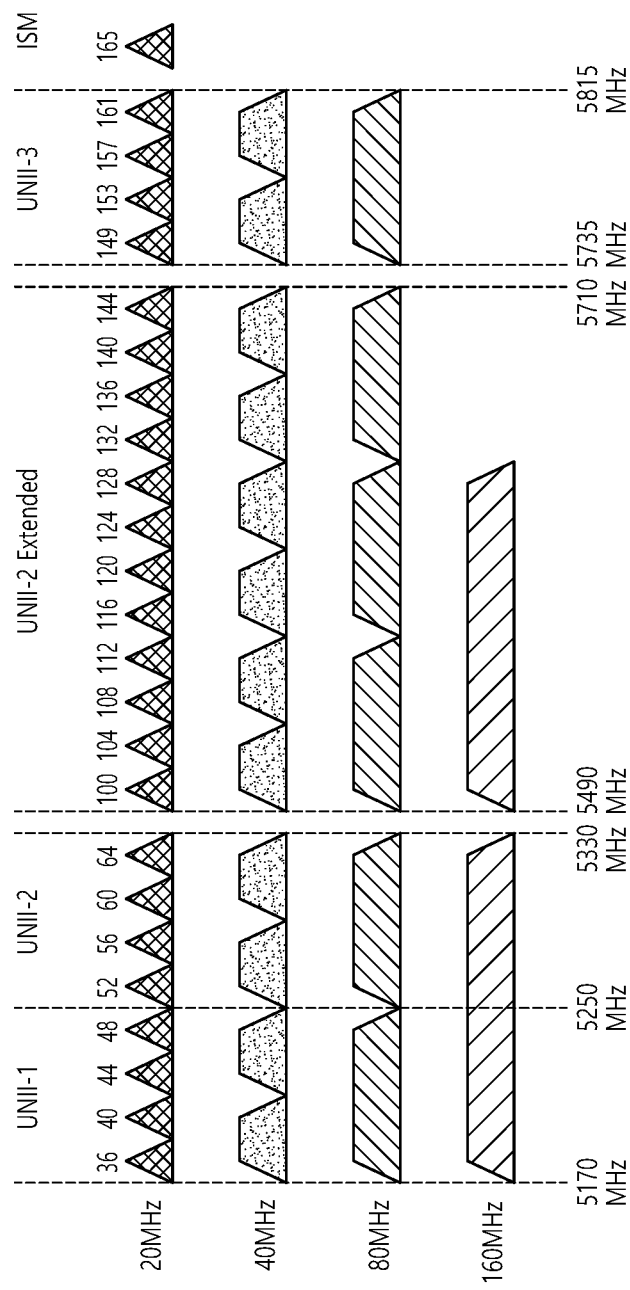
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
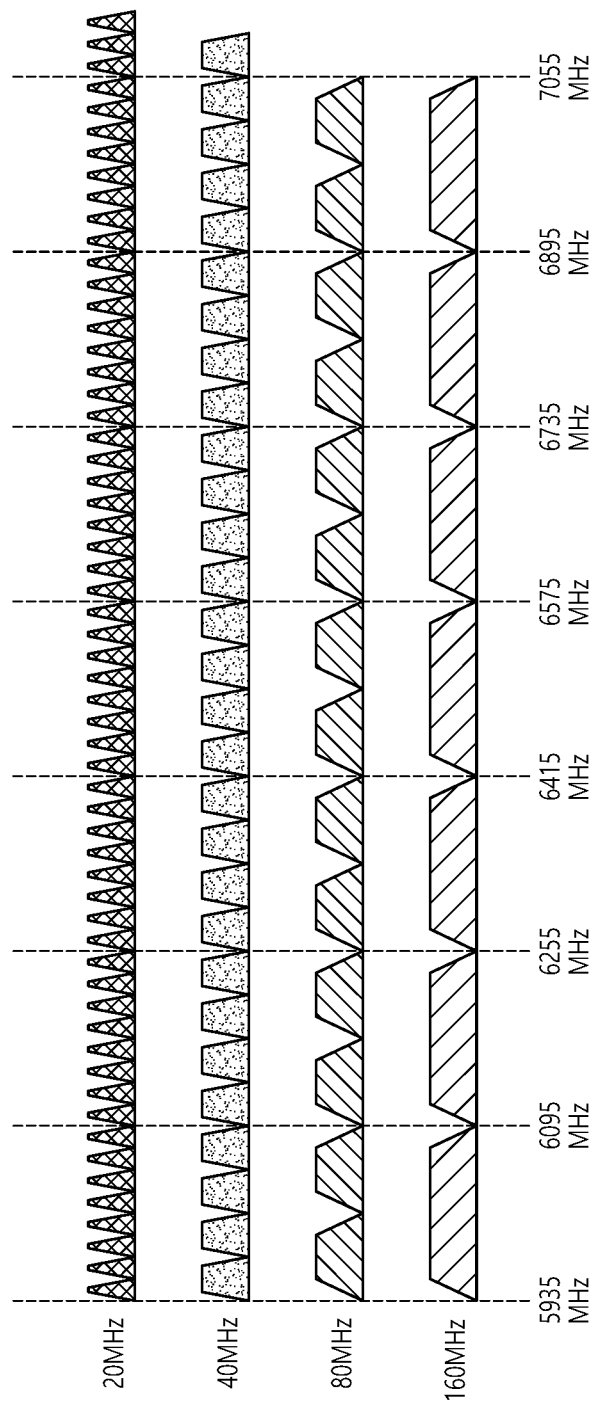
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | | 52 | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | 52 | | 1 |
| 22 | | 106 | | | 26 | 52 | | 26 | 26 | 1 |
| 23 | | 106 | | | 26 | 52 | | 52 | | 1 |
| 24 | 52 | | 52 | | — | 52 | | 52 | | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | 52 | | 1 |
| 62 | 26 | | 26 + 52 | | 26 | 52 | | 26 | 26 | 1 |
| 63 | 26 | 26 | | 52 | 26 | 52 + 26 | | | 26 | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 64 | 26 |  | 26 + 52 |  | 26 |  | 52 + 26 |  | 26 | 1 |
| 65 | 26 |  | 26 + 52 |  | 26 |  | 52 |  | 52 | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 |  | 26 | 26 | 26 |  | 52 + 26 |  | 26 | 1 |
| 67 | 52 |  | 52 |  | 26 |  | 52 + 26 |  | 26 | 1 |
| 68 | 52 |  | 52 + 26 |  |  | 52 |  | 52 |  | 1 |
| 69 | 26 | 26 | 26 | 26 |  |  | 26 + 106 |  |  | 1 |
| 70 | 26 |  | 26 + 52 |  | 26 |  | 106 |  |  | 1 |
| 71 | 26 | 26 | 52 |  |  |  | 26 + 106 |  |  | 1 |
| 72 | 26 |  | 26 + 52 |  |  |  | 26 + 106 |  |  | 1 |
| 73 |  | 52 | 26 | 26 |  |  | 26 + 106 |  |  | 1 |
| 74 |  | 52 | 52 |  |  |  | 26 + 106 |  |  | 1 |
| 75 |  |  | 106 + 26 |  |  | 26 | 26 | 26 | 26 | 1 |
| 76 |  |  | 106 + 26 |  |  | 26 | 26 |  | 52 | 1 |
| 77 |  |  | 106 + 26 |  |  | 52 |  | 26 | 26 | 1 |
| 78 |  |  | 106 |  | 26 |  | 52 + 26 |  | 26 | 1 |
| 79 |  |  | 106 + 26 |  |  |  | 52 + 26 |  | 26 | 1 |
| 80 |  |  | 106 + 26 |  |  |  | 52 |  | 52 | 1 |
| 81 |  |  | 106 + 26 |  |  |  | 106 |  |  | 1 |
| 82 |  |  | 106 |  |  |  | 26 + 106 |  |  | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M = \{-1, -1, -1, 1, 1, 1, -1, 1, 1, 1, -1, 1, 1, -1, 1\} \quad \text{(Equation 1)}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT-STF(-112:16:112) = \{M\} * (1 + j)/sqrt(2) \quad \text{(Equation 2)}$$

$$EHT-STF(0) = 0$$

The EHT-STF for the 40 MHz PPDU may be configured based on the following equation. The following example may be the first type (i.e., 1×STF) sequence.

$$EHT-STF(-240:16:240) = \{M, 0, -M\} * (1 + j)/sqrt(2) \quad \text{(Equation 3)}$$

The EHT-STF for the 80 MHz PPDU may be configured based on the following equation. The following example may be the first type (i.e., 1×STF) sequence.

$$EHT-STF(-496:16:496) = \quad \text{(Equation 4)}$$

$$\{M, 1, -M, 0, -M, 1, -M\} * (1 + j)/sqrt(2)$$

The EHT-STF for the 160 MHz PPDU may be configured based on the following equation. The following example may be the first type (i.e., 1×STF) sequence.

$$EHT\text{-}STF(-1008{:}16{:}1008) = \qquad \langle \text{Equation 5} \rangle$$
$$\{M, 1, -M, 0, -M, 1, -M, 0, -M,$$
$$-1, M, 0, -M, 1, -M\} * (1+j)/sqrt(2)$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496{:}16{:}496) = \qquad \langle \text{Equation 6} \rangle$$
$$\{-M, -1, M, 0, -M, 1, -M\} * (1+j)/sqrt(2)$$

Equation 7 to Equation 11 below relate to an example of a second type (i.e., 2×STF) sequence.

$$EHT\text{-}STF(-120{:}8{:}120) = \{M, 0, -M\} * (1+j)/sqrt(2) \qquad \langle \text{Equation 7} \rangle$$

The EHT-STF for the 40 MHz PPDU may be configured based on the following equation.

$$EHT\text{-}STF(-248{:}8{:}248) = \qquad \langle \text{Equation 8} \rangle$$
$$\{M, -1, -M, 0, M, -1, M\} * (1+j)/sqrt(2)$$
$$EHT\text{-}STF(-248) = 0$$
$$EHT\text{-}STF(248) = 0$$

The EHT-STF for the 80 MHz PPDU may be configured based on the following equation.

$$EHT\text{-}STF(-504{:}8{:}504) = \qquad \langle \text{Equation 9} \rangle$$
$$\{M, -1, M, -1, -M, -1, M, 0, -M, 1, M, 1, -M, 1, -M\} *$$
$$(1+j)/sqrt(2)$$

The EHT-STF for the 160 MHz PPDU may be configured based on the following equation.

$$EHT\text{-}STF(-1016{:}16{:}1016) = \qquad \langle \text{Equation 10} \rangle$$
$$\{M, -1, M, -1, -M, -1, M, 0, -M, 1, M,$$
$$1, -M, 1, -M, 0, -M, 1, -M, 1, M, 1, -M,$$
$$0, -M, 1, M, 1, -M, 1, -M\} * (1+j)/sqrt(2)$$
$$EHT\text{-}STF(-8) = 0, EHT\text{-}STF(8) = 0,$$
$$EHT\text{-}STF(-1016) = 0, EHT\text{-}STF(1016) = 0$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504) = \qquad \langle \text{Equation 11} \rangle$$
$$\{-M, 1, -M, 1, M, 1, -M, 0, -M, 1, M, 1, -M, 1, -M\} *$$
$$(1+j)/sqrt(2)$$
$$EHT\text{-}STF(-504) = 0,$$
$$EHT\text{-}STF(504) = 0$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
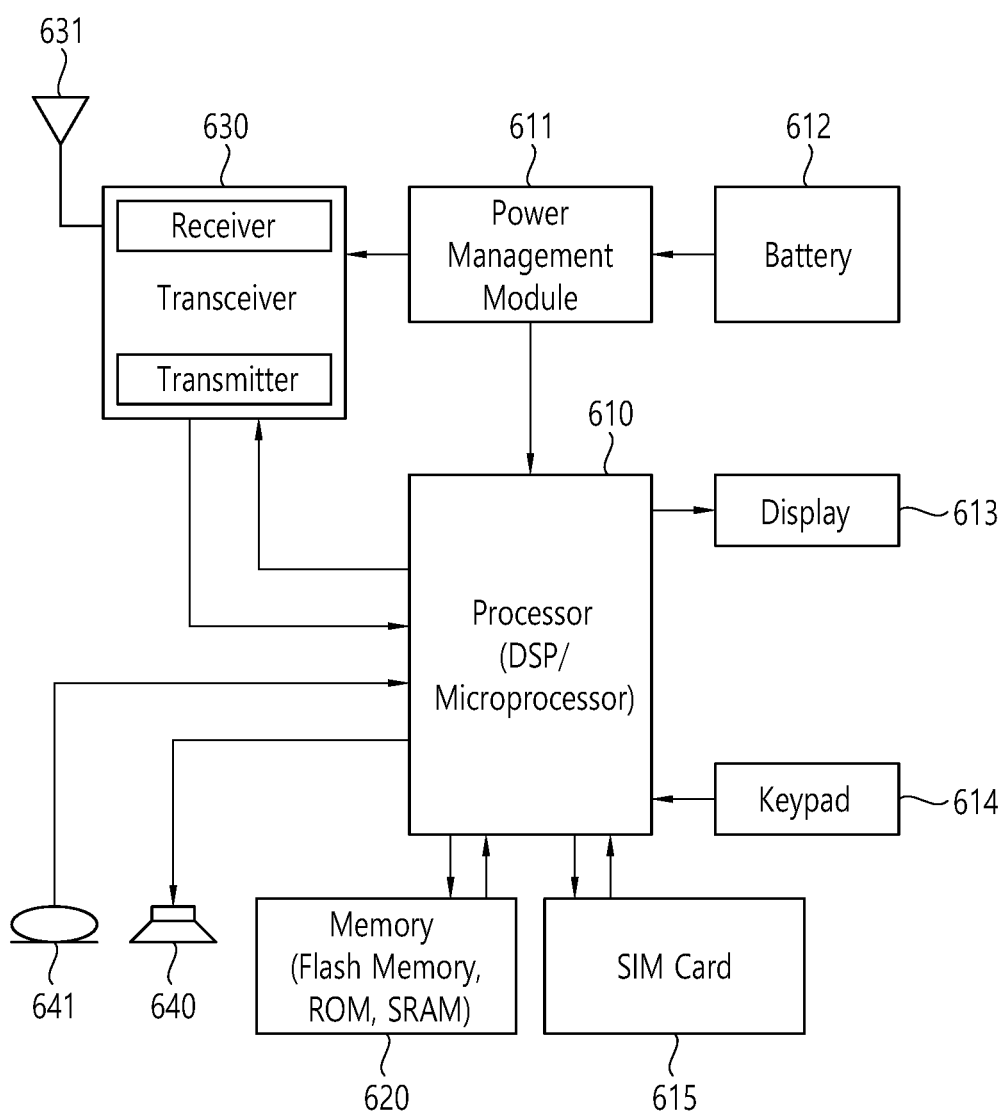
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
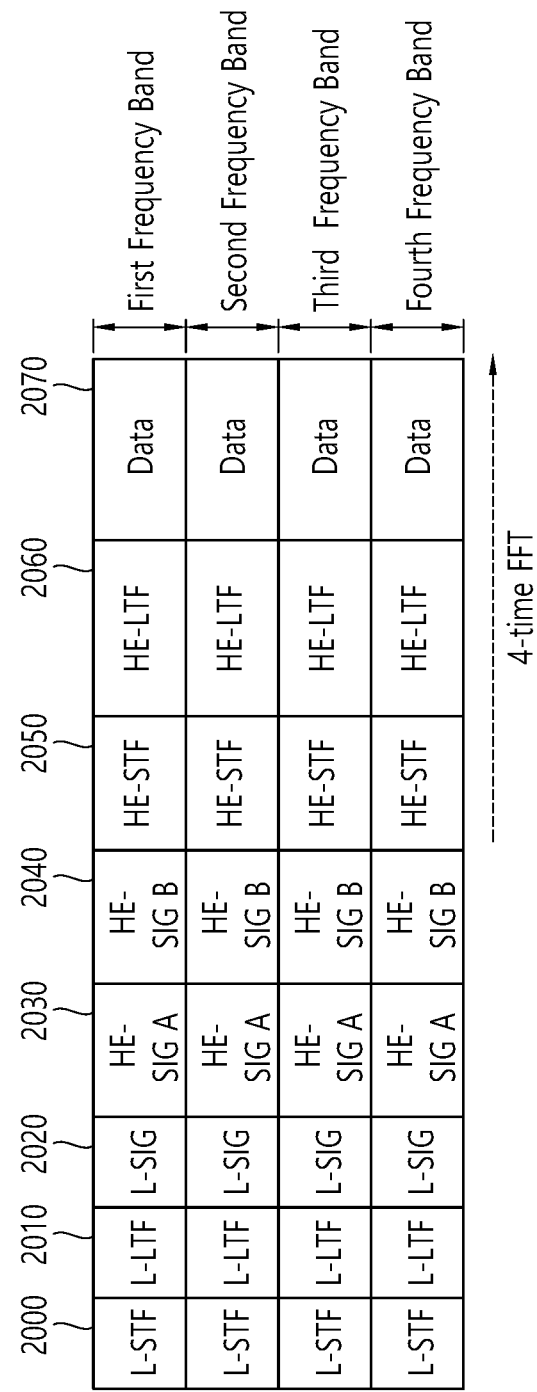
FIG. 20 shows an example of a HE-PPDU.

FIG. 20 shows an example of a HE-PPDU.

The illustrated L-STF 2000 may include a short training orthogonal frequency division multiplexing symbol (OFDM). The L-STF 2000 may be used for frame detection, automatic gain control (AGC), diversity detection, and coarse frequency/time synchronization.

The L-LTF 2010 may include a long training orthogonal frequency division multiplexing symbol (OFDM). The L-LTF 2010 may be used for fine frequency/time synchronization and channel estimation.

The L-SIG 2020 may be used to transmit control information. The L-SIG 2020 may include information related to a data transmission rate and a data length. Also, the L-SIG 2020 may be repeatedly transmitted. That is, the L-SIG 2020 may be configured in a repeated format (e.g., may be referred to as R-LSIG).

The HE-SIG-A 2030 may include control information common to the receiving station(s).

Specifically, the HE-SIG-A 2030 may include information related to: 1) a DL/UL indicator; 2) a BSS color field that is an identifier of the BSS; 3) a field indicating the remaining time of the current TXOP duration/period; 4) a Bandwidth field indicating whether 20, 40, 80, 160, 80+80 MHz; 5) a field indicating MCS scheme applied to the HE-SIG-B; 6) an indication field indicating whether modulation dual subcarrier modulation (DCM) is applied to the HE-SIG-B for MCS; 7) a field indicating the number of symbols used for HE-SIG-B; 8) a field indicating whether the HE-SIG-B is generated over the full/entire band; 9) a field indicating the number of symbols of the HE-LTF; 10) a field indicating a length of the HE-LTF and a CP length; 11) a field indicating whether additional OFDM symbols exist for LDPC coding; 12) a field indicating control information related to Packet Extension (PE); and/or 13) a field indicating information related to a CRC field of the HE-SIG-A, and the like. At least one field of the HE-SIG-A may be omitted or changed. In addition, some fields may be added or omitted in other environments where the HE-SIG-A is not a multi-user (MU) environment.

Also, the HE-SIG-A 2030 may be composed of two parts: HE-SIG-A1 and HE-SIG-A2. The HE-SIG-A1 and HE-SIG-A2 included in the HE-SIG-A may be defined in the following format structure (field) according to a corresponding PPDU. First, the HE-SIG-A field of the HE SU PPDU may be defined as follows.

TABLE 8

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (27-6), |

TABLE 8-continued

| Two Parts of HE-SIG-A Bit | Field | Number of bits | Description |
|---|---|---|---|
| | | | Equation (27-9), Equation (27-12), Equation (27-14), Equation (27-16) and Equation (27-18) apply if the Beam Change field is set to 1. Set to 0 to indicate that the pre-HE modulated fields of the PPDU are spatially mapped the same way as the first symbol of the HE-LTF on each tone. Equation (27-8), Equation (27-10), Equation (27-13), Equation (27-15), Equation (27-17) and Equation (27-19) apply if the Beam Change field is set to 0. |
| B2 | UL/DL | 1 | Indicates whether the PPDU is sent UL or DL. Set to the value indicated by the TXVECTOR parameter UPLINK_FLAG. |
| B3-B6 | UL/DL | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 9

| Two Parts of HE-SIG-A Bit | Field | Number of bits | Description |
|---|---|---|---|
| B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC. |
| B8-B13 | BSS Color | 5 | The BSS Color field is an identifier of the BSS. Set to the value of the TXVECTOR parameter BSS_COLOR. |
| B14 | Reserved | 1 | Reserved and set to 1 |
| B15-B18 | Spatial Reuse | 4 | Indicates whether or not spatial reuse is allowed during the transmission of this PPDU. Set to a value from Table 27-22 (Spatial Reuse field encoding for an HE SU PPDU, HE ER SU PPDU, and HE MU PPDU), see 26.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |
| B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |

TABLE 10

| Two Parts of HE-SIG-A | Bit | Field | Number of bits | Description |
|---|---|---|---|---|
| | B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of spacetime streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if TXVECTOR parameter TXOP_DURATION is set to UNSPECIFIED.<br>Set to a value less than 127 to indicate duration information<br>for NAV setting and protection of the TXOP as follows:<br>If TXVECTOR parameter TXOP_DURATION is less than 512, then B0 is set to 0 and B1-B6 is set to<br>floor(TXOP_DURATION/8).<br>Otherwise, B0 is set to 1 and B1-B6 is set to floor ((TXOP_DURATION − 512)/128).<br>where<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |

TABLE 11

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0. |
| | B9 | STBC | 1 | If the DCM field is set to 0, then set to 1 if space time block coding is used. Neither DCM nor STBC shall be applied if both the DCM field and STBC field are set to 1.<br>Set to 0 otherwise. |
| | B10 | Beamformed | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4 |

TABLE 11-continued

| Two Parts of HE-SIG-A | Bit | Field | Number of bits | Description |
|---|---|---|---|---|
| | | | | Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity as defined in 27.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 27.3.11.16 (Midambles), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 27.3.10.7.3 (CRC computation)). Bits 0-41 of the HESIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 12

| Two Parts of HE-SIG-A | Bit | Field | Number of bits | Description |
|---|---|---|---|---|
| HE-SIG-A1 | B0 | Format | 1 | Indicates whether the PPDU is sent UL or DL. Set to the value indicated by the TXVECTOR parameter UPLINK_FLAG.<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_-COLOR. |
| | B11-B14 | Spatial Reuse | 4 | Indicates whether or not spatial reuse is allowed during the transmission of this PPDU.<br>Set to the value of the SPATIAL_REUSE parameter of the TXVECTOR, which contains a value from Table 27-22 (Spatial Reuse field encoding for an HE SU PPDU, HE ER SU PPDU, and HE MU PPDU) (see 26.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |

TABLE 13

| Two Parts of HE-SIG-A | Bit | Field | Number of bits | Description |
|---|---|---|---|---|
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz subchannels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIGB field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1. |
| | B22 | SIGB Compression | 1 | Set to 0 if the Common field in HE-SIG-B is present.<br>Set to 1 if the Common field in HE-SIG-B is not present. |

TABLE 14

| Two Parts of HE-SIG-A | Bit | Field | Number of bits | Description |
|---|---|---|---|---|
| | B23-B24 | GI + LTF Size | 2 | Indicates the GI duration and HE-LTF size:<br>Set to 0 to indicate a 4x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate a 4x HE-LTF and 3.2 μs GI |
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 27.3.11.16 (Midambles), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration |

TABLE 14-continued

| Two Parts of HE-SIG-A | Bit | Field | Number of bits | Description |
|---|---|---|---|---|
| | | | | information for NAV setting and protection of the TXOP as follows:<br>If TXVECTOR parameter TXOP_DURATION is less than 512, then B0 is set to 0 and B1-B6 is set to floor(TXOP_DURATION/8).<br>Otherwise, B0 is set to 1 and B1-B6 is set to floor ((TXOP_DURATION − 512)/128).<br>where<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |

TABLE 15

| Two Parts of HE-SIG-A | Bit | Field | Number of bits | Description |
|---|---|---|---|---|
| | B8-B10 | Number of HE-LTF Symbols And Midamble Periodicity | 3 | If the Doppler field is set to 0, indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1, B8-B9 indicates the number of HE-LTF symbols and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity as defined in 27.3.12 (Packet extension). |
| | B16-B19 | CRC | 4 | CRC for bits 0-41 of the HE-SIG-A field (see 27.3.10.7.3 (CRC computation)). Bits 0-41 of the HESIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 16

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 27-23 (Spatial Reuse field encoding for an HE TB PPDU) for an HE TB PPDU (see 26.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |

TABLE 17

| Two Parts of HE-SIG-A | Bit | Field | Number of bits | Description |
|---|---|---|---|---|
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 27-23 (Spatial Reuse field encoding for an HE TB PPDU) for an HE TB PPDU (see 26.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |

TABLE 18

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If the STA operating channel width is 80 + 80 MHz, this field is set to the same value as Spatial Reuse 1 field. Set to the value of the SPATIAL_REUSE(3) parameter of the TXVECTOR, which contains a value from Table 27-23 (Spatial Reuse field encoding for an HE TB PPDU) for an HE TB PPDU (see 26.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |

TABLE 19

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If the STA operating channel width is 20 MHz, then this field is set to the same value as Spatial Reuse 1 field. If the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If the STA operating channel width is 80 + 80 MHz, then this field is set to same value as Spatial Reuse 2 field. Set to the value of the SPATIAL_REUSE(4) parameter of the TXVECTOR, which contains a value from Table 27-23 (Spatial Reuse field encoding for an HE TB PPDU) for an HE TB PPDU (see 26.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRPbased spatial reuse and non-SRG OBSS PD-based spatial reuse during this PPDU. For the interpretation of other values see 26.11.6 (SPATIAL_REUSE) and 26.10 (Spatial reuse operation). |
| | B23 | Reserved | 1 | Reserved and set to 1. NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz Set to 1 for 40 MHz Set to 2 for 80 MHz Set to 3 for 160 MHz and 80 + 80 MHz |

TABLE 20

| Two Parts of HE-SIG-A | Bit | Field | Number of bits | Description |
|---|---|---|---|---|
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8).<br>Otherwise, B0 is set to 1 and B1-B6 is set to floor ((TXOP_DURATION-512)/128).<br>where<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIGA2 Reserved subfield in the Trigger frame |
| | B16-B19 | CRC | 4 | CRC of bits 0-41 of the HE-SIG-A field. See 27.3.10.7.3 (CRC computation). Bits 0-41 of the HESIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

The HE-SIG-B 2040 may be included only for a multiple-user (MU) PPDU as described above. Basically, the HE-SIG-A 2050 or the HE-SIG-B 2060 may include resource allocation information (or virtual resource allocation information) for at least one receiving STA.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 21:
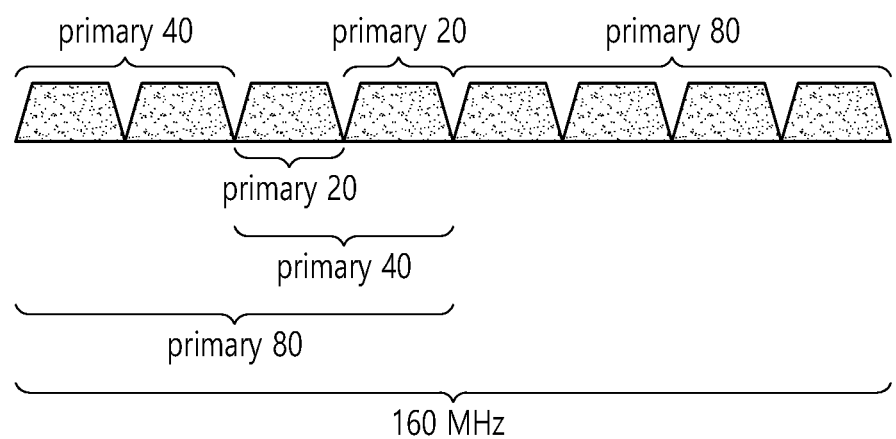
FIG. 21 illustrates an example of channel bonding.

FIG. 21 illustrates an example of channel bonding. As shown in FIG. 20, the primary 20 MHz channel and the secondary 20 MHz channel may configure a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the primary 20 MHz channel, the secondary 20 MHz channel, the secondary 40 MHz channel, and the secondary 80 MHz channel may be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the primary 20 MHz channel, the secondary 40 MHz channel, and the secondary 80 MHz channel are all in the idle state, but the secondary 20 MHz channel is in the busy state, bonding to the secondary 40 MHz channel and the secondary 80 MHz channel may not be possible. In this case, the STA may configure a 160 MHz PPDU and may perform a preamble puncturing on a preamble (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.) transmitted through the secondary 20 MHz channel, so that the STA may transmit a signal through a channel in the idle state. In other words, the STA may perform preamble puncturing for some bands of the PPDU. Information related to the preamble puncturing (for example, information related to 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one a management frame, a control frame, and a data frame.

When one STA supports a plurality of links, a transceiver supporting each link may operate as one logical STA. For example, one STA supporting two links could be expressed as one multi-link device (MLD) including a first STA for a first link and a second STA for a second link. For example, one AP supporting two links could be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (the AP MLD and/or the non-AP MLD) may transmit information about a link that the corresponding MLD can support through ML setup. Link information may be configured in various ways. For example, information about the link may include at least one of 1) information related to whether the MLD (or STA) supports simultaneous RX/TX operation, 2) information related to the number/upper limit of uplink/downlink links supported by the MLD (or STA), 3) information about the location/band/resource of the uplink/downlink link supported by the MLD (or STA), 4) information related to available or preferred frame types (management, control, data, etc.) in at least one uplink/downlink link, 5) ACK policy information available or preferred in at least one uplink/downlink link, and 6) information related to available or preferred traffic identifier (TID) in at least one uplink/downlink link. The TID is related to the priority of traffic data and is expressed as eight types of values according to the conventional wireless LAN standard. That is, eight TID values corresponding to four access categories (AC) (AC_BK(background), AC_BE(best effort), AC_VI(video), AC_VO(voice)) according to the conventional WLAN standard may be defined.

For example, it may be pre-configured in advance that all TIDs are mapped for uplink/downlink link. Specifically, when negotiation is not made through ML setup, all TIDs are used for ML communication. If the mapping between the uplink/downlink link and the TID is negotiated through additional ML settings, the negotiated TID may be used for ML communication.

A plurality of links usable by the transmitting MLD and the receiving MLD related to ML communication may be configured through ML setup, and this may be referred to as an "enabled link". The "enabled link" may be called differently in various expressions. For example, it may be referred to as various expressions such as a first link, a second link, a transmission link, and a reception link.

After the ML setup is completed, the MLD may update the ML setup. For example, the MLD may transmit information about a new link when it is necessary to update information about the link. Information related to the new link may be transmitted based on at least one a management frame, a control frame, and a data frame.

According to an embodiment, the MLD may include a non-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

In the following specification, MLD may refer to a multi-link device. The MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

According to an embodiment, the AP MLD or the non-AP MLD may be configured in a structure having a plurality of links. In other words, the non-AP MLD may support the plurality of links. The non-AP MLD may include a plurality of STAs. The plurality of STAs may have a link for each STA.

A multi-link device (MLD) structure in which one AP/non-AP MLD supports multiple links is considered as a core technique in the EHT standard (802.11be standard). A STA included in the non-AP MLD may transfer information on other STAs in the non-AP MLD together through one link. Accordingly, there is an advantage in that an overhead is reduced for frame exchange. In addition, there is an advantage in that link usage efficient of the STA is increased, and power consumption is decreased.

FIG. 22 illustrates an example of a structure of a non-AP MLD.

Referring to FIG. 22, the non-AP MLD may be configured with a structure having a plurality of links. In other words, the non-AP MLD may support the plurality of links. The non-AP MLD may include a plurality of STAs. Each of the plurality of STAs may have a link. Although FIG. 22 illustrates the example of the structure of the non-AP MLD structure, a structure of an AP MLD may also be configured to be the same as the example of the structure of the non-AP MLD illustrated in FIG. 22.

For example, the non-AP MLD may include a STA 1, a STA 2, and a STA 3. The STA 1 may operate on a link 1. The link 1 may be included in a 5 GHz band. The STA 2 may operate on a link 2. The link 2 may be included in a 6 GHz band. The STA 3 may operate on a link 3. The link 3 may be included in a 5 GHz band. A band in which the link 1/2/3 is included is for exemplary purposes only, and may also be included in 2.4, 5, and 6 GHz bands.

As such, in case of the AP/non-AP MLD supporting the multi-link, APs of the AP MLD and STAs of the non-AP MLD may be connected to respective links through a link setup procedure. In addition, the link connected in this case may be switched or re-connected to another link by the AP MLD or the non-AP MLD according to a situation.

In addition, in the EHT standard, the link may be classified into an anchored link and a non-anchored link to reduce power consumption. The anchored link or the non-anchored link may be called variously. For example, the anchored link may be called a primary link. The non-anchored link may be called a secondary link.

According to an embodiment, the AP MLD supporting the multi-link may manage each link by specifying the link as the anchored link or the non-anchored link. The AP MLD may support one or more links as the anchored link, among a plurality of links. The non-AP MLD may use one or more anchored links thereof selected from an anchored link list (an anchored link list supported by the AP MLD).

For example, the anchored link may be used for not only frame exchange for synchronization but also non-data frame exchange (i.e., beacon and management frames). In addition, the non-anchored link may be used only for data frame exchange.

The non-AP MLD may monitor only the anchored link to receive beacon and management frames during an idle period. Therefore, the non-AP MLD shall be connected to at least one anchored link to receive the beacon and management frames. The one or more anchored links shall always maintain an enable state. Unlike this, the non-anchored link is used only for data frame exchange. Therefore, a STA corresponding to the non-anchored link (or a STA connected to the non-anchored link) may enter a doze state during the idle period in which a channel/link is not used. Accordingly, there is an advantage in that power consumption can be decreased.

In the specification described below, a protocol in which an AP MLD or a non-AP MLD dynamically recommends or requests a link reconnection according to a situation may be proposed for efficient link connection. In addition, in the specification described below, an anchored link reconnection protocol may be additionally proposed in consideration of a characteristic of not only a typical link but also an anchored link used for the purpose of power reduction.

Embodiment for Link Switching and Reconnection

According to an embodiment, each link between an AP MLD and a non-AP MLD may be determined in an association or (re)association procedure. In this case, the AP MLD and the non-AP MLD may perform frame exchange through a connected link. A specific embodiment in which the AP MLD and the non-AP MLD are connected through a link setup procedure may be described with reference to FIG. 23.

Figure 23:
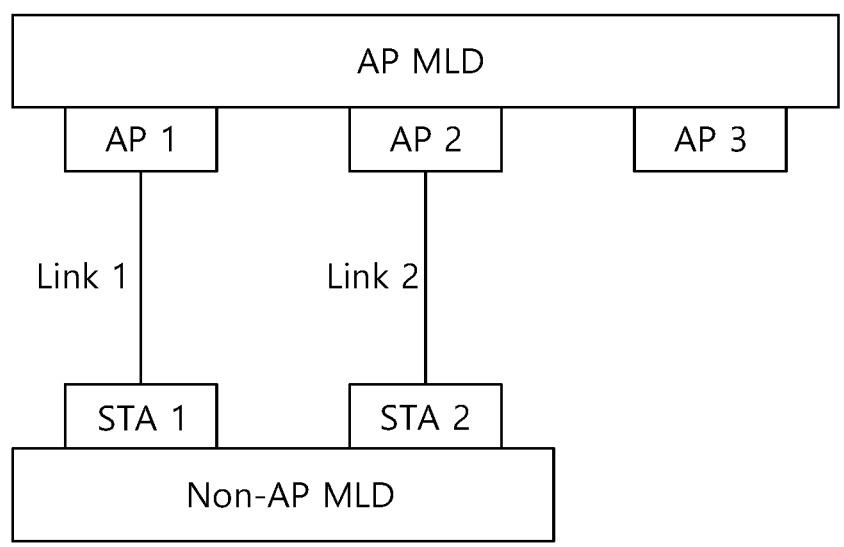
FIG. 23 illustrates an example in which an AP MLD and a non-AP MLD are connected through a link setup procedure.

FIG. 23 illustrates an example in which an AP MLD and a non-AP MLD are connected through a link setup procedure.

Referring to FIG. 23, the AP MLD may include an AP 1, an AP 2, and an AP 3. The non-AP MLD may include a STA 1 and a STA 2. The AP 1 and the STA 1 may be connected through a link 1. The AP 2 and the STA 2 may be connected through a link 2.

For example, the AP 1 and the STA 1 may be connected through the link 1 by using a first link setup procedure. The AP 2 and the STA 2 may be connected through the link 2 by using a second link setup procedure. As another example, the AP MLD and the non-AP MLD may be connected through a link setup procedure performed once. In other words, the AP MLD and the non-AP MLD may be connected through the link 1 and the link 2, based on the link setup procedure performed once.

As described above, each of the AP and the STA may perform frame exchange through the connected link. In addition, information on other APs for different links or other STAs for different links may be transmitted/received through one link.

However, after the link setup procedure, the AP MLD or the non-AP MLD may request for link switching or reconnection for more efficient frame exchange (e.g., load balancing or interference avoiding, etc.) according to a situation/environment.

An embodiment for the link switching or reconnection may be described with reference to FIG. 24.

Figure 24:
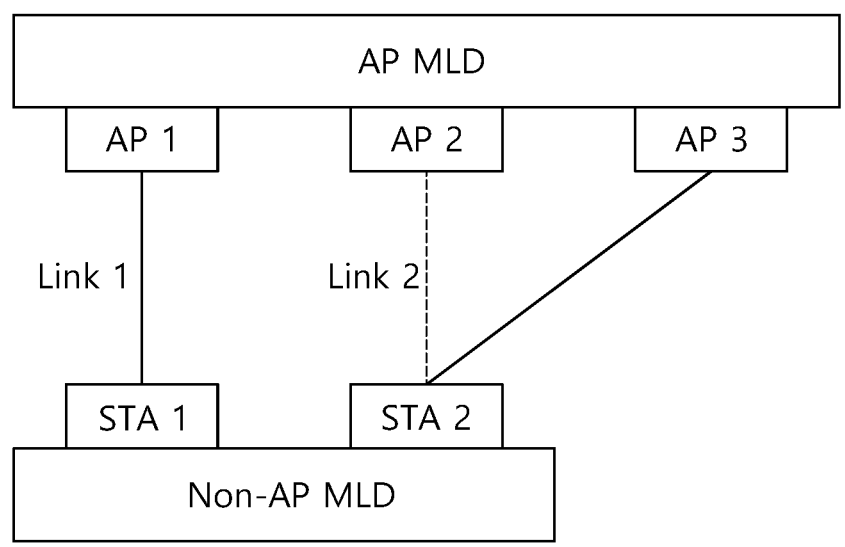
FIG. 24 illustrates an example in which a link is switched or reconnected.

FIG. 24 illustrates an example in which a link is switched or reconnected.

Referring to FIG. 24, a STA 2 is previously connected to an AP 2. There may be an excessive data load of the AP 2 at a later time. The STA 2 may be reconnected to an AP 3 which has a relatively small data load. In this case, there is an advantage in that an AP MLD and a non-AP MLD may effectively perform data exchange.

Figure 25:
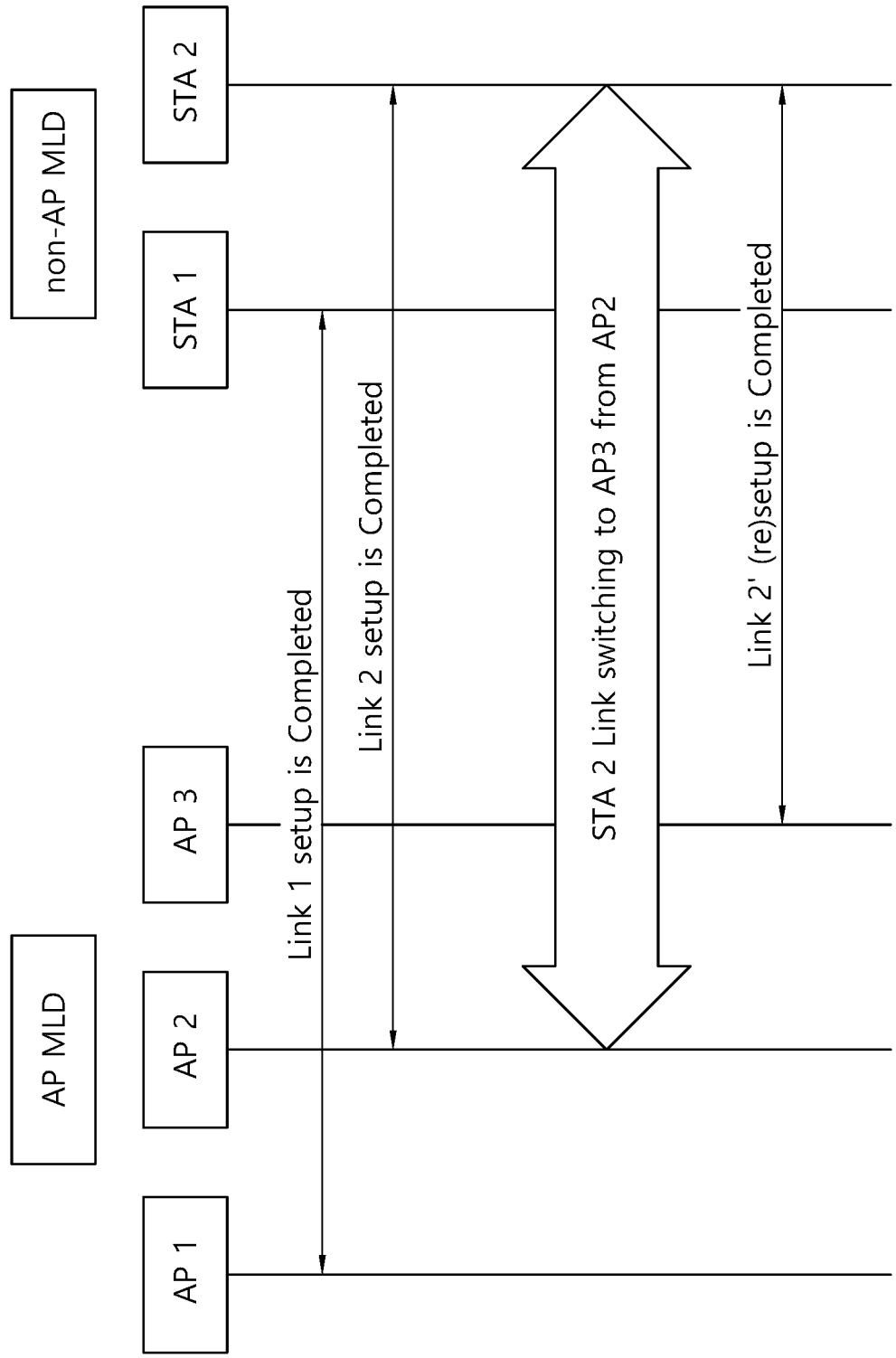
FIG. 25 illustrates an example in which a link is switched or reconnected in detail.

FIG. 25 illustrates an example in which a link is switched or reconnected in detail.

Referring to FIG. 25, an AP 1 of an AP MLD may be connected to a STA 1 of a non-AP MLD through a link 1. An AP 2 of the AP MLD may be connected to a STA 2 through a link 2. At a later time, the STA 2 may attempt/request a connection to an AP 3 through link switching or reconnection, and the STA 2 may be connected to the AP 3 through the link 2, based on the link switching or reconnection.

According to an embodiment, the AP MLD and the non-AP MLD may transmit and receive and/or exchange a variety of information for each current link and information on a link state. Therefore, based on the link state and the variety of information for each current link, the AP MLD and the non-AP MLD may select a link which is more appropriate to transmit/receive a signal. For example, the variety of information for each current link may include information on a data traffic load for each link and channel access capability between the links. For example, the link state may be set to 'disable' or 'enable' or the like.

In the specification described below, a process in which the AP MLD/non-AP MLD negotiates with the non-AP MLD/AP MLD to request switching or reconnection to another link, not a link connected to improve performance, may be called "link switching negotiation". The term of the "link switching negotiation" may be variously called and changeable.

Hereinafter, the link switching or reconnection process may be described distinctively for a case of being requested by the AP MLD and a case of being requested by the non-AP MLD.

Embodiment in which an AP MLD Requests for Link Switching or Reconnection

According to an embodiment, for effective data transmission, an AP MLD may request a non-AP MLD for link switching or reconnection. For example, for load balancing, the AP MLD may request a STA for switching or reconnection to a more effective link, based on data traffic of each AP.

For example, the AP MLD may calculate/verify/confirm a link appropriate for STAs of the non-AP MLD, based on data traffic load information for each AP and/or channel access capability information between the links (e.g., information on simultaneous TX/RX (STR) capability, etc.), or the like. Thereafter, the AP MLD may request the STA (or non-AP MLD) for the link switching or reconnection, based on the data traffic load for each AP and/or the channel access capability information between the links, or the like.

As described above, when the link switching is requested, the AP MLD may transmit link information which is considered most appropriate for the non-AP MLD through the request message. For example, the request message may include a beacon or management frame, or the like.

An element or field including link information which is considered most appropriate may be proposed, in association with the embodiment described above. The newly proposed element or field may be defined as a "recommended link". The "recommended link" is for exemplary purposes, and the specific term "element" or "field" is changeable.

recommend link (element/field): an element or field used when an AP MLD recommends a link which is most appropriate for a STA of a non-AP MLD, based on a variety of information for each link (e.g., a data load for each link, etc.). For example, the recommended link (element/field) may be indicated by AP MLD's link ID information or AP BSS information, etc. In other words, the recommended link (element/field) may include AP MLD's link ID information or AP BSS information, etc.

According to an embodiment, the recommended link (element/field) may be transmitted optionally by being included in a link switching response. For example, the STA may establish a connection to a link recommended by the AP, based on the element/field (i.e., recommended link). As another example, the STA may request a connection to a link different from the indicated link, based on the element/field (i.e., recommended link) and additional information owned by the STA.

A specific signal exchange process of the AP MLD and non-AP MLD may be described with reference to FIG. 26 according to the aforementioned embodiment.

Figure 26:
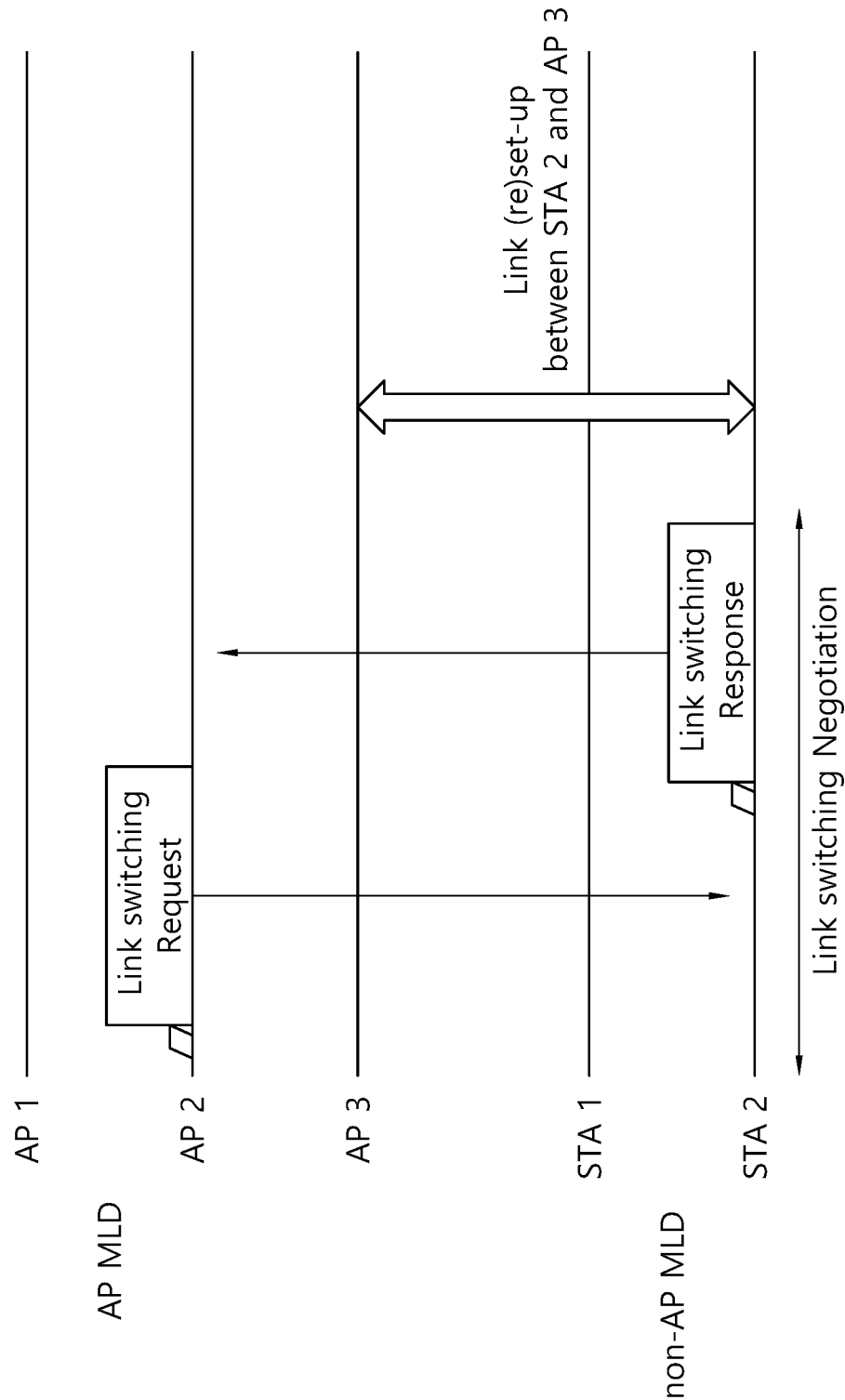
FIG. 26 illustrates an operation of an AP MLD and non-AP MLD for link switching or reconnection.

FIG. 26 illustrates an operation of an AP MLD and non-AP MLD for link switching or reconnection.

Referring to FIG. 26, in a situation where a STA 2 is connected to an AP 2 through a link 2, a lot of data traffic may be concentrated in the AP 2. In other words, in the situation where the STA 2 is connected to the AP 2 through the link 2, a lot of data traffic may be generated in the AP 2.

The AP MLD (or AP 2) may request the non-AP MLD (or STA 2) to reconnect to an AP 3 which has relatively few STA connections. In general, a message for requesting the reconnection is transmitted to the STA (i.e., the STA 2) which desires to be reconnected, but may be transmitted to any STA (i.e., other STAs) according to a situation (e.g., a channel situation or a link state). In other words, a STA to which a request message (e.g., a link switching request frame) for requesting the reconnection is transmitted may be switched according to the channel situation or the link state.

For example, the STA (i.e., STA 2) which has received the request message for requesting the reconnection may transmit a response message of "accept" (e.g., a link switching response frame) when the request is accepted. As another example, the STA (i.e., STA 2) may transmit a response message of "decline" when the request is declined.

In general, the STA (e.g., STA 2) which accepts the reconnection transmits the response message to the existing link (e.g., a link connected before the reconnection), but the response message may also be transmitted through any link (i.e., other STAs) by using a multi-link characteristic.

If the STA 2 accepts the link reconnection request, after transmission of the response message, the STA 2 may disconnect from the existing AP 2 and may request a link reconnection to an AP 3. In this case, a reconnection request process may be performed identically to a link setup process between the existing MLDs. After the link setup process is complete between the AP 3 and the STA 2, the STA 2 may perform frame exchange with the AP 3 through the link 2.

Otherwise, if the STA 2 declines the link reconnection request, the STA 2 and the AP 2 may directly use the previously connected link (i.e., link 2).

According to an embodiment, when the AP requests the STA for link switching, if an appropriate link is recommended, the STA may switch the link to the recommended link or may not switch the link. For example, in order for the AP to recommend the link appropriate for the STA, the aforementioned recommended link may be used.

For example, the STA may accept the link switching with a response message for the request message for requesting the reconnection of the AP. The STA may accept/verify the link switching to the recommended link, and may request the AP for another link switching, based on different information other than information included in the request message.

Accordingly, the AP may need to notify the STA of whether the response message is accepted. To this end, the AP may transmit to the STA a confirmation message (e.g., a link switching confirmation frame) for a response message (e.g., a link switching response frame) of the STA.

A specific operation of the AP MLD and non-AP MLD of the aforementioned embodiment may be described with reference to FIG. 27.

Figure 27:
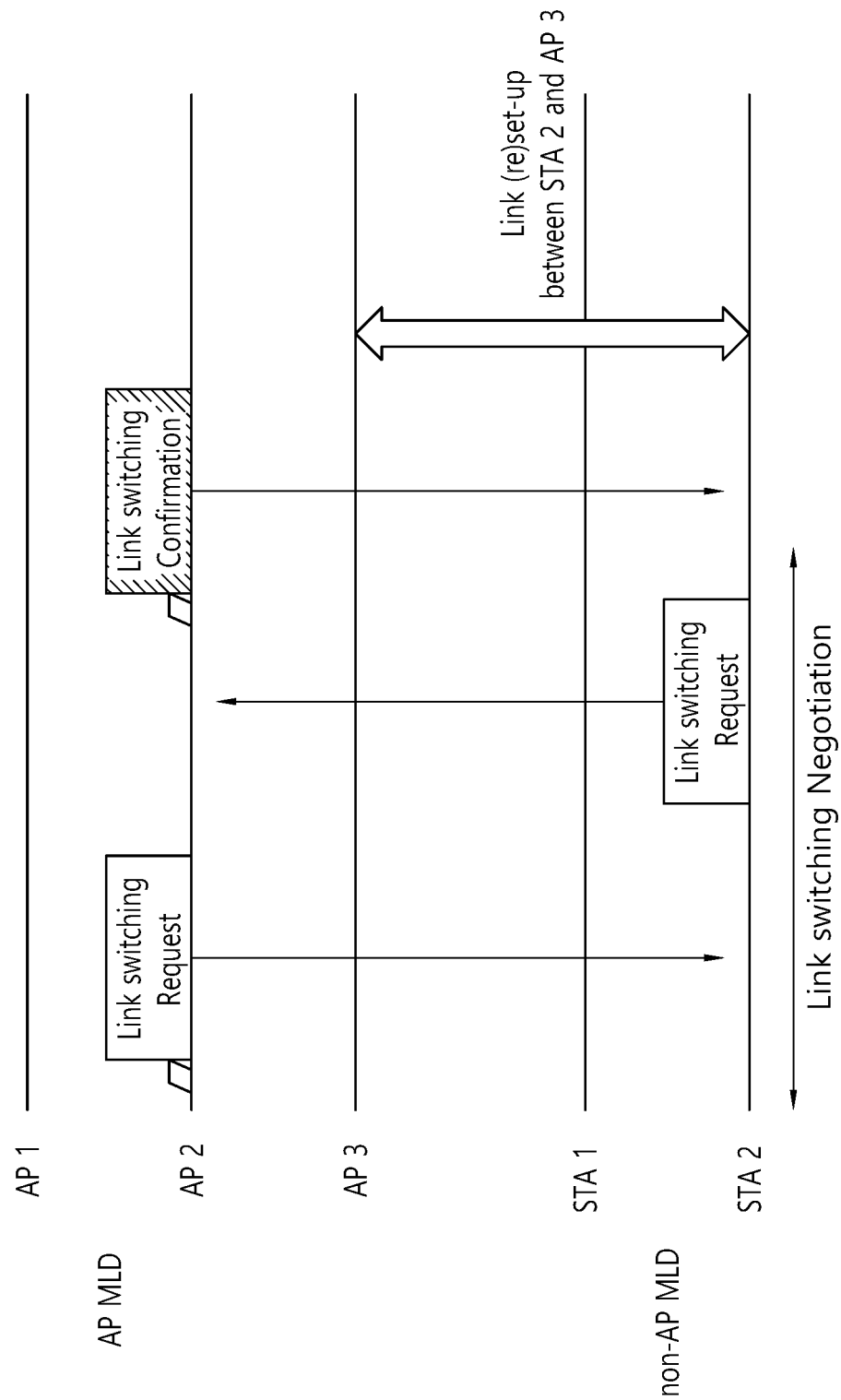
FIG. 27 illustrates an operation of an AP MLD and non-AP MLD for link switching or reconnection.

FIG. 27 illustrates an operation of an AP MLD and non-AP MLD for link switching or reconnection.

Referring to FIG. 27, an AP 2 may request a STA 2 for link switching by including recommended link information. In other words, the AP 2 may transmit to the STA 2 a link switching request frame including the recommended link information.

The STA 2 may transmit whether a link request is accepted through a link switching response frame.

For example, when link switching is accepted, the STA 2 may transmit a link switching response frame including information on a link to be switched. In this case, the information on the link to be switched may be identical to, or different from, a recommended link.

As another example, when the STA 2 responds with a link switching response frame by selecting a different link other than the recommended link provided by the AP 2, the AP may transmit to the STA a message indicating whether it is finally accepted. The message may be called a link switching confirmation frame.

For example, the AP 2 may accept link switching to a link specified by the STA 2, through the link switching confirmation frame. The STA 2 may attempt to switch the link to the link specified by the STA 2, based on the link switching confirmation frame.

As another example, the AP 2 may decline the link switching to the link specified by the STA 2, through the link switching confirmation frame. The STA 2 and the AP 2 may maintain a connection with the previously connected link without having to switch the link.

The embodiment illustrated in FIG. 27 may also apply to a case where the AP transmits the link switching request frame without including the recommended link information. For example, when the AP (e.g., AP 2) transmits the link switching request frame to the STA (e.g., STA 2) without the recommended link information, the STA may directly specify a link to be switched, based on information owned by the STA, and then may respond to the AP through the link switching response frame. In this case, the AP shall also finally transmit the link switching confirmation frame for the accept. Therefore, even if the recommend link information is not included in the link switching request frame, the embodiment in which the AP transmits the link switching confirmation frame may apply.

Embodiment in which a Non-AP MLD Requests for Link Switching or Reconnection

According to an embodiment, a non-AP MLD may request an AP MLD for link switching or reconnection in order to perform efficient data transmission. For example, in order to use STR capability in data transmission, the non-AP MLD may request the AP MLD to switch or reconnect to a connected link.

Figure 28:
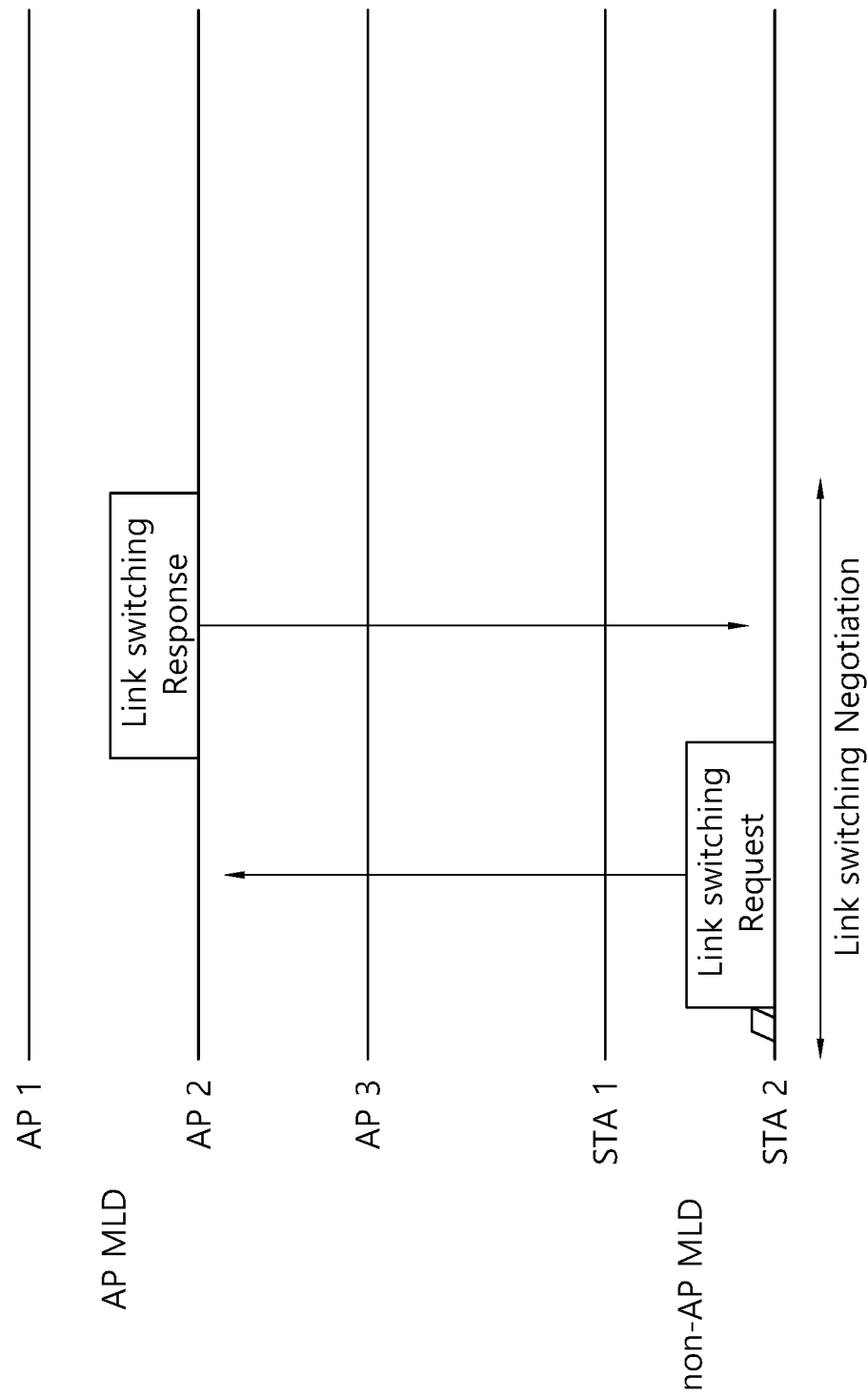
FIG. 28 illustrates an operation of an AP MLD and non-AP MLD for link switching or reconnection.

FIG. 28 illustrates an operation of an AP MLD and non-AP MLD for link switching or reconnection.

Referring to FIG. 28, the AP MLD and the non-AP MLD may perform link switching negotiation. A STA 2 of the non-AP MLD may transmit a link switching request frame to an AP 2 of the AP MLD. The AP 2 of the AP MLD may transmit a link switching response frame to the STA 2 of the non-AP MLD, in response to the link switching request frame. The link switching request frame or the link switching response frame may be transmitted/received through a link to be switched, but the present disclosure is not limited thereto. The link switching request frame or the link switching response frame may be transmitted/received through not only the link to be switched but also various links.

The non-AP MLD may request the link switching or reconnection through various methods. Hereinafter, three methods may be proposed as a method in which the non-AP requests the link switching or reconnection. Specifically, the three methods may be described in the order of a solicited method, an unsolicited method, and a general method.
1) Solicited method: a method in which the non-AP MLD requests the AP MLD for a variety of information for link (re)selection, thereby requesting for link (re)selection, based on the received information.
2) Unsolicited method: a method in which the AP transmits a variety of information for the link (re)selection, without an additional information request, thereby requesting for link (re)selection based on the received information.
3) General method: a method in which the non-AP MLD requests for a link (re)selection without additional information, based on information obtained through a previous beacon frame or the like.

1) Solicited Method

Hereinafter, an embodiment for the aforementioned solicited method may be described first.

According to an embodiment, a non-AP MLD may request an AP MLD for information for selecting an appropriate link before link switching or reconnection. A STA may utilize per-AP data load information or per-link capability information (or information on other links) or the like to choose the appropriate link.

For example, the per-link capability information may be periodically transmitted by being included in a beacon frame or the like.

As another example, the per-link capability information is optional information, and may not be included in the beacon frame transmitted every period. Only information on a link to which the STA is connected or an associated partial link may be received to reduce a frame overhead. Alternatively, when a beacon reception period is long due to a characteristic of the non-AP MLD (e.g., a low-power device), the non-AP MLD may not receive per-link capability information for selecting a more appropriate link.

In the aforementioned cases, the non-AP MLD may request for the latest information of per-link capability information and per-link information of the AP MLD. A link of the per-link capability information and per-link information may include not only a link for transmission/reception but also other links. In order to request for the latest information of the per-link capability information and per-link information, the STA may transmit to the AP a request message to request for information required for link reselection.

For example, through the request message, the STA may specify required specific information and request the AP for the specified information. The specific information to be specified may change depending on a situation. That is, the STA may request for only information corresponding to a specific link, or may request for only information corresponding to specific capability. In this case, the AP may transmit only information specified by the STA through the response message.

As another example, the STA may request for all capability information (e.g., including information on other links) currently owned by the AP MLD through the request message.

As described in the aforementioned example, an embodiment for transmitting every information owned by the AP or an embodiment for transmitting only specific information specified by the STA may be defined/configured variously. For example, the AP may transmit every information or specified information, based on an additional field, a bitmap, or the like.

In general, a message for requesting the AP MLD for information may be transmitted through a STA which desires reconnection, but may also be transmitted through any STA (i.e., other STAs) according to a situation (a channel situation or a link situation).

The AP MLD which has received the request message may transmit to the non-AP MLD a response message (i.e., an information message) including latest information (e.g., per-link data load information, STA capability information between links, etc.) required for link reselection.

In general, the response message may be transmitted through the AP which has received the request message, but may also be transmitted to any AP (i.e., other APs) by using a multi-link characteristic.

Optionally, the AP MLD may transmit a "recommended link" element, which recommends a link appropriate for the STA, together through the response message including the aforementioned variety of information (e.g. the latest information required for link reselection).

Hereinafter, the aforementioned request message and response message may be described as an information request message and an information response message to distinguish from a request message for link switching and a response message for the link switching.

Based on information included in the aforementioned information response message, the STA may reselect an appropriate link and request the AP MLD for link switching or reconnection through the request message for link switching. The request message for link switching may include information on an AP or link to which the STA is to be reconnected.

The AP MLD which has received the request message may transmit a response message of "accept" when the request is accepted. The AP MLD may transmit a response message of "decline" when the request is declined.

If the request is accepted, after the response message is transmitted, the AP may perform link (re)setup, based on frame exchange through a reselected link of the AP. Otherwise, if the request is declined, the STA may directly use a previously connected link.

An example of the AP MLD and non-AP MLD according to the solicited method may be described in detail with reference to FIG. 29.

Figure 29:
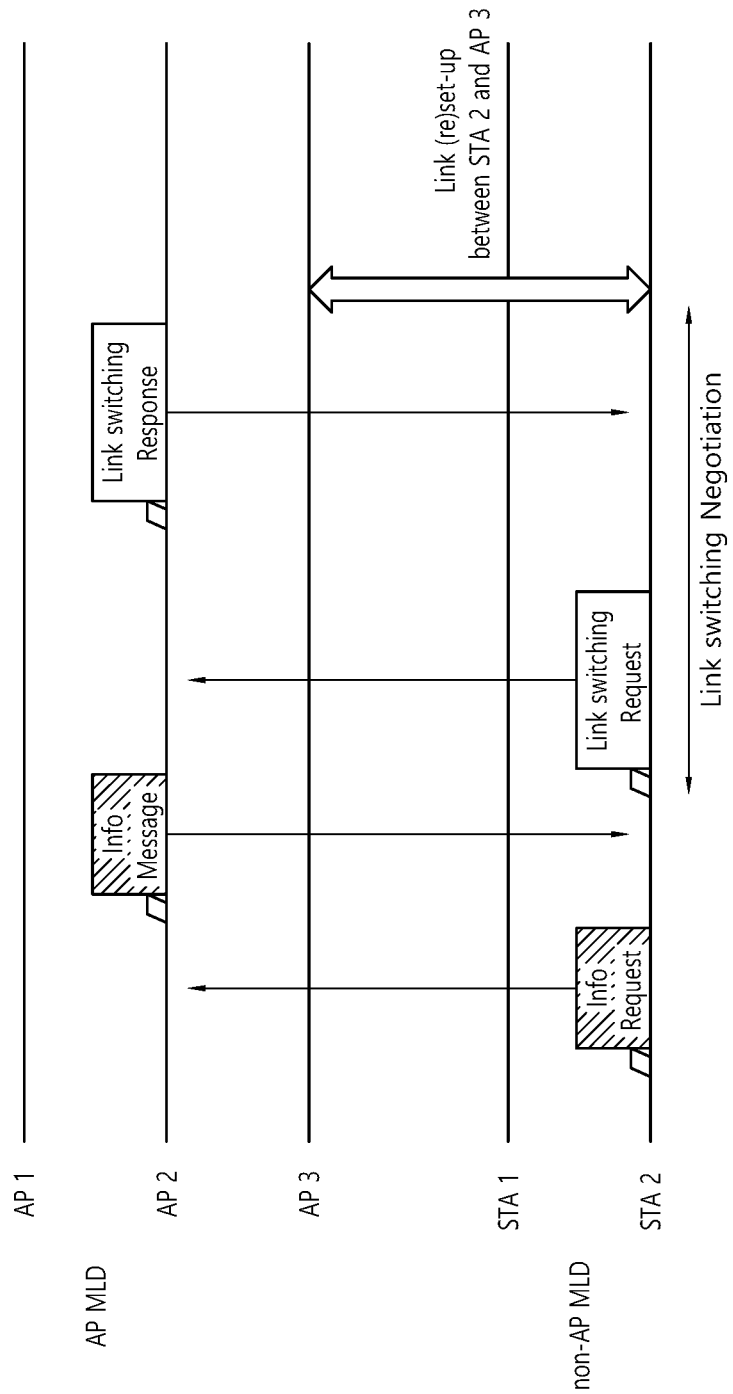
FIG. 29 illustrates an operation of an AP MLD and non-AP MLD for link switching or reconnection.

FIG. 29 illustrates an operation of an AP MLD and non-AP MLD for link switching or reconnection.

Referring to FIG. 29, when it is desired to reselect a link to which a STA 2 of the non-AP MLD is connected, the STA 2 may transmit an Info request message to the AP MLD through a link 2. The AP MLD which has received this message may transmit an Info response message including information required for the link reselection of the non-AP MLD. Based on information included in the aforementioned Info response message, the STA 2 of the non-AP MLD may transmit a request message for link switching (i.e., a link switching request frame) to an AP 2 of the AP MLD. Thereafter, the STA 2 may receive a response message for link switching (i.e., a link switching response frame) and perform link (re)set-up for link switching.

Hereinafter, a new element/field including information used by the STA of the non-AP MLD to select an appropriate link may be proposed.

For example, an "STA ratio per link" (element/field) may be proposed. "STA ratio per link" may include information on a ratio of the number of STAs connected for each link. An example of the "STA ratio per link" may be described in detail with reference to FIG. 30.

Figure 30:
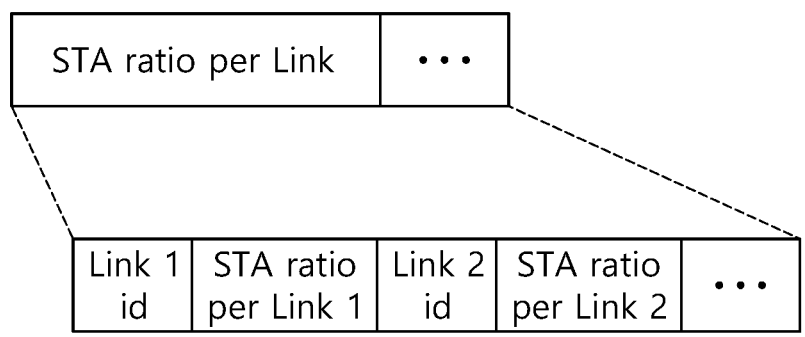
FIG. 30 illustrates an example of a STA ratio per link in detail.

FIG. 30 illustrates an example of a STA ratio per link in detail.

Referring to FIG. 30, the STA ratio per link (element/field) may include information on a ratio or the number of STAs connected for each link in all AP MLDs.

For example, when 50 STAs are connected to the AP MLD having 3 links, 10 STAs may be connected to a link 1, and 20 STAs may be connected to a link 2. The AP MLD may transmit information on the STA connected for each link to a non-AP MLD through the STA ratio per link (element/field) as information on a value or ratio (%).

For example, when the information on the STA connected for each link is represented as a value, the link 1 may be represented/set to 10, and the link 2 may be represented/set to 20. Therefore, a value of a STA ratio per link 1 may be set to 10. In addition, a value of a STA ratio per link 2 may be set to 20.

As another example, when the information on the STA connected for each link is represented as a ratio, the link 1 may be represented/set to 20 ($^{10}/_{50}$)%, and the link 2 may be represented/set to 40 ($^{20}/_{50}$)%. Therefore, the value of the STA ratio per link 1 may be set to 20. In addition, the value of the STA ratio per link 2 may be set to 40.

The aforementioned example is for exemplary purposes only, and the information on the STA connected for each link may be set variously. In addition to the aforementioned example, information on the STA connected for each link may be set as a relative value.

Based on the information on the STA connected for each link, the STA may verify/obtain the number and ratio of the STAs connected for each link, and may use this as information for link selection.

According to an embodiment, in addition to the "STA ratio per link" (element/field), a variety of information/element/field may be included in an information response message. For example, the following information/element/field may be included in the information response message.

BSS load information for each AP
    STR capability information between links
    TXOP information for each link
    NAV information for each link
    recommended link information (i.e., "recommend link" element)
    information of ratio of STAs connected for each link (i.e., "STA ratio per link" element)
    etc.

In addition to the aforementioned information/element/field, a variety of information required for link selection may be transmitted by being included in the information response message.

The STA which has received the aforementioned exemplary information may select an AP to be switched or reconnected by the STA, based on the received information, and then may transmit a request message for requesting link reconnection. The AP which has received the request message may transmit a response message of "accept" when the request is accepted. The AP MLD may transmit a response message of "decline" when the request is declined.

If the request is accepted, the AP may perform frame exchange through a reselected link with the AP after transmission of the response message. Otherwise, if the request is declined, the STA may directly use a previously connected link.

2) Unsolicited Method

Unlike the solicited method in which the non-AP MLD directly requests for additional information, according to the unsolicited method, the AP MLD may transmit the additional information to the non-AP MLD through a beacon frame or an additional frame (e.g., a management frame, a PS-poll frame, a null frame, or the like) without an additional information request of the non-AP MLD.

For example, when a beacon period is long to some extent, necessary information required for link switching may be insufficient or may not be the latest information. Therefore, the AP may transmit a frame including link capability information on the AP MLD to the non-AP MLD. Thereafter, the non-AP STA may obtain the latest information for capability of each link of the AP MLD.

For example, changed information may be transmitted to a connected STA whenever link capability of the AP of the AP MLD changes. In this case, the STA may maintain the latest information for the link capability.

According to the aforementioned example, since the non-AP STA does not transmit a request message for obtaining additional link capability, there is an advantage in that a frame exchange overhead is relatively small compared to the solicited method.

An example of operations of an AP MLD and non-AP MLD according to the unsolicited method may be described in detail with reference to FIG. 31.

Figure 31:
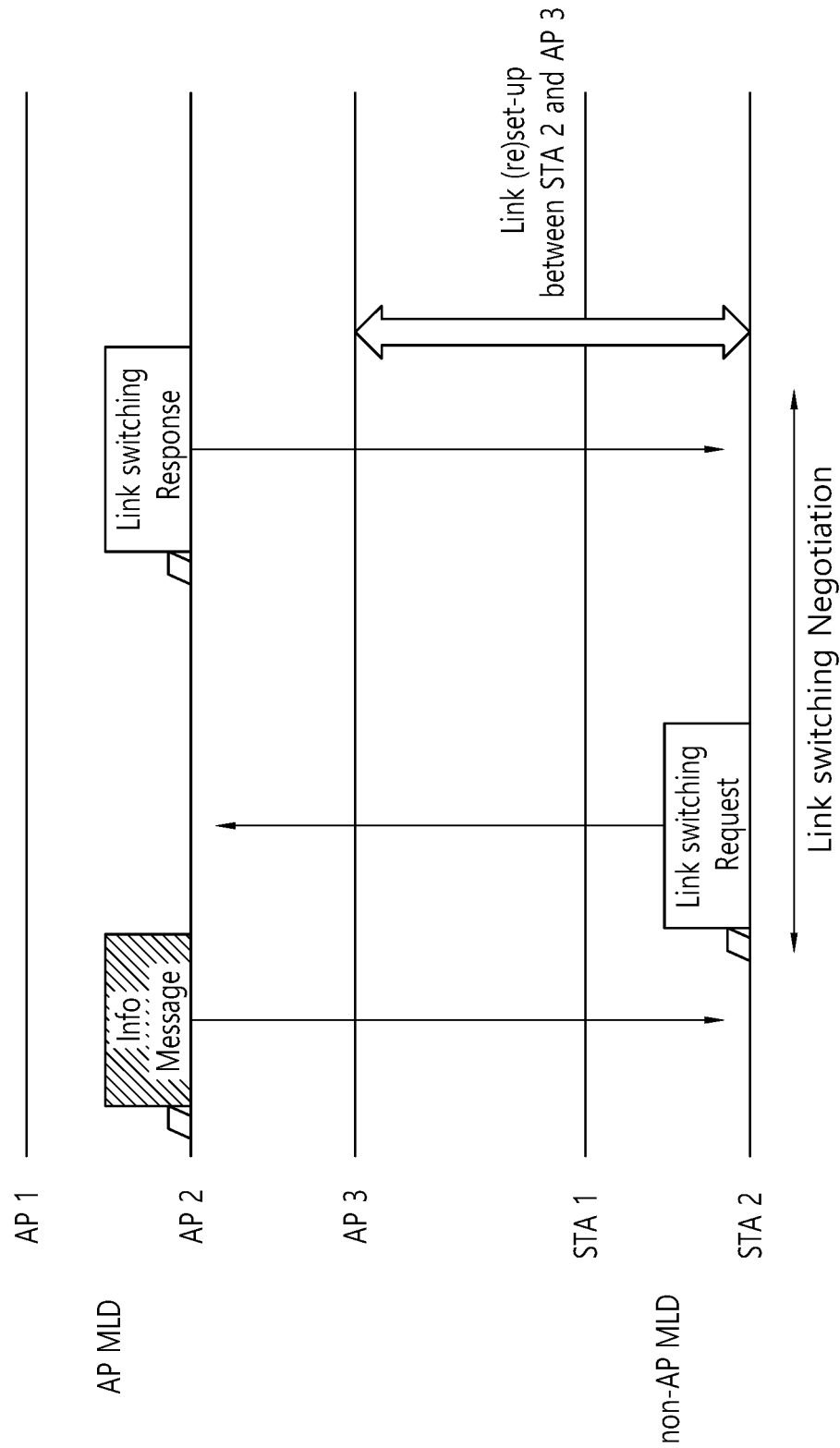
FIG. 31 illustrates an operation of an AP MLD and non-AP MLD for link switching or reconnection.

FIG. 31 illustrates an operation of an AP MLD and non-AP MLD for link switching or reconnection.

Referring to FIG. 31, the AP MLD may transmit necessary information required for link reselection to a non-AP through an additional frame (e.g., an Info message), without an additional request message of the non-AP MLD.

Therefore, the non-AP MLD may obtain the latest link capability information irrespective of a beam frame period. The non-AP MLD may select an appropriate link in link switching, based on received information. The STA may reselect the appropriate link and request the AP MLD for link switching or reconnection, based on the received information. The request message may include information on an AP or link to which the STA is to be reconnected. In addition, the AP MLD which has received this message may transmit a response message of "accept" when a request is accepted, and may transmit a response message of "decline" when the request is declined.

If the request is accepted, after the response message is transmitted, the AP may perform link (re)setup, based on frame exchange through a reselected link of the AP. Otherwise, if the request is declined, the STA may directly use a previously connected link.

3) General Method

According to the general method, a non-AP MLD may request for link switching or reconnection without an additional information request, based on information currently owned by the non-AP MLD. Information used in this case may include information on an AP MLD and information on a non-AP MLD (e.g., per-link STR capability information, link state (enable/disable) information, etc.), included in a previously received beacon or management frame, etc.

Unlike in the solicited method, a STA may directly transmit a request message for link switching or reconnection to the AP MLD without having to request the AP MLD for an additional information request. The request message may include information on an AP or link to which the STA is to be reconnected. The AP MLD which has received the request message may transmit a response message of "accept" when the request is accepted, and may transmit a response message of "decline" when the request is declined.

If the request is accepted, the AP may perform frame exchange through a reselected link with the AP after transmission of the response message. Otherwise, if the request is declined, the STA may directly use a previously connected link.

An example of an operation of an AP MLD and non-AP MLD according to the general method may be described in detail with reference to FIG. 32.

Figure 32:
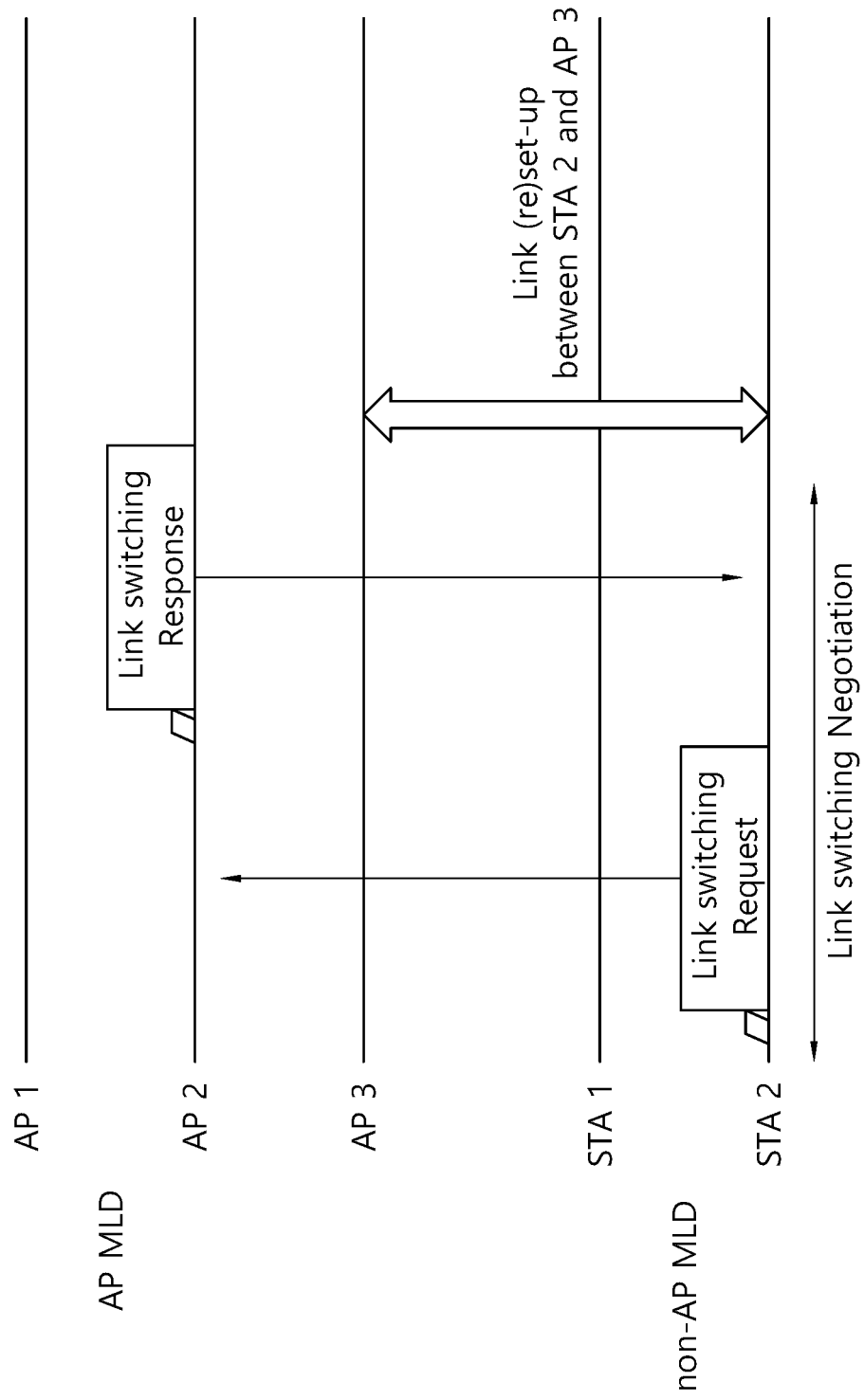
FIG. 32 illustrates an operation of an AP MLD and non-AP MLD for link switching or reconnection.

FIG. 32 illustrates an operation of an AP MLD and non-AP MLD for link switching or reconnection.

Referring to FIG. 32, a STA 2 may desire to directly switch a link for the purpose of guaranteeing QoS. When the STA 2 has information previously received from the AP MLD (e.g., information received through a beacon frame, a management frame, etc.) or has already determined a link to be reconnected, the STA 2 may request the link switching or reconnection without an additional information request.

The STA 2 may transmit a link switching request frame including STA information (e.g., STA ID, etc.) and information on a link to be switched (e.g., a link ID, AP BSS information, etc.). The AP MLD which has received this may transmit a link switching response frame of "accept" to a STA 3 when the switching is accepted. Thereafter, the STA 2 of the non-AP MLD may be reconnected to an AP 3 after performing a link (re)setup process.

Embodiment for Anchored Link Switching and Reconnection

According to an embodiment, an AP MLD may support an anchored link. When the AP MLD supports the anchored link, there are issues to be additional considered in an embodiment for the aforementioned link switching and reconnection.

The AP MLD may support one or more anchored links, and may provide information on the one or more anchored links to a non-AP MLD through an anchored link list information/element. The non-AP MLD may select one or more links from the anchored link list and use the link as an anchored link of the non-AP MLD. The remaining links other than the link selected as the anchored link may operate as a non-anchored link.

The anchored link and the non-anchored link have a trade-off relationship in terms of power consumption and a data load. That is, when the non-AP MLD uses one anchored link, an amount of power consumption may be reduced, but it may be difficult to ensure data (in particular, data for a beacon and management frame) transmission QoS. On the contrary, when a plurality of anchored links are used, the data transmission QoS is ensured, but the reduction in the amount of power consumption may be decreased.

Therefore, for effective data exchange, the non-AP MLD shall be able to dynamically request for reselection of the anchored link. Accordingly, hereinafter, an embodiment in which the non-AP MLD dynamically requests for anchored link switching/reselection may be proposed.

First, an MLD structure supporting an anchored link may be described with reference to FIG. 33.

Figure 33:
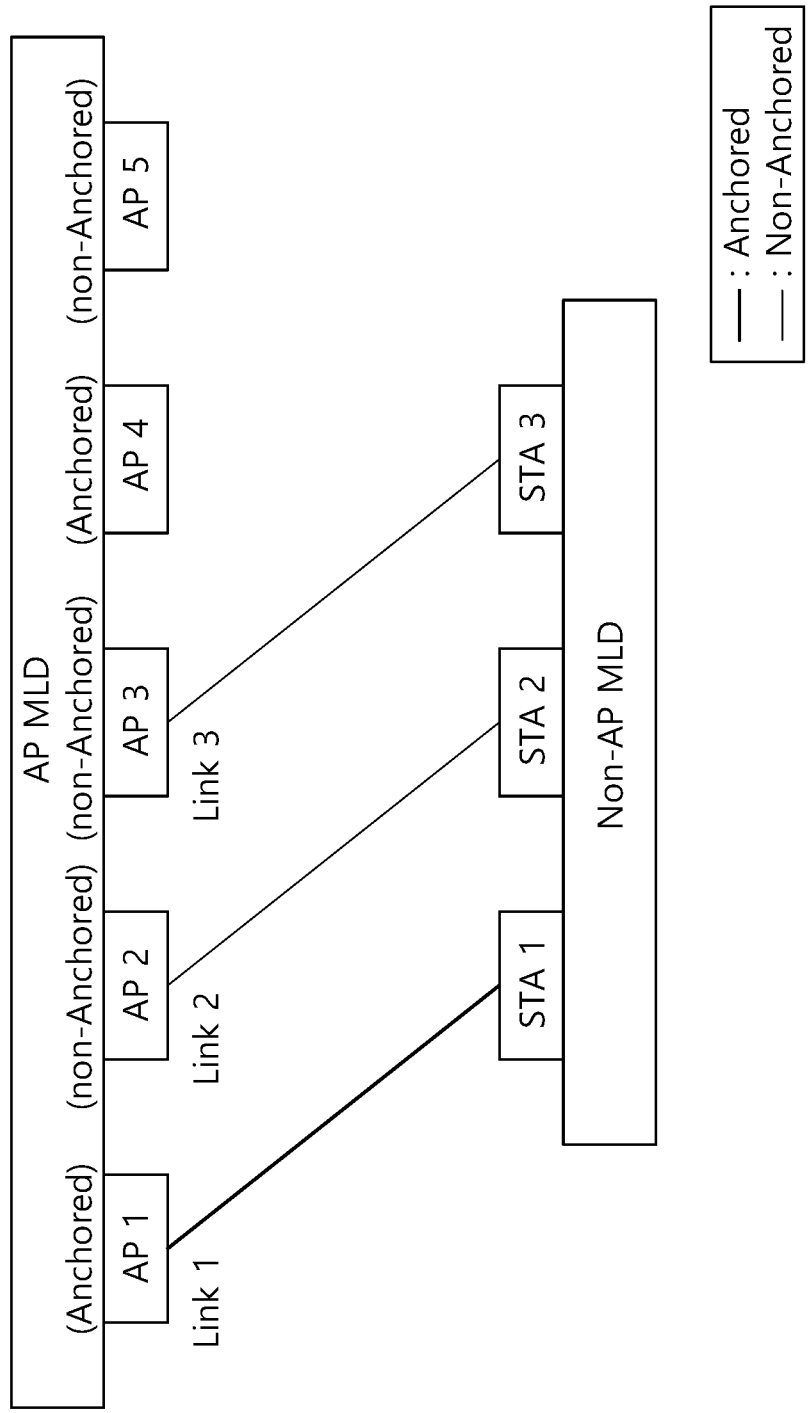
FIG. 33 illustrates an example of an MLD structure supporting an anchored link.

FIG. 33 illustrates an example of an MLD structure supporting an anchored link.

Referring to FIG. 33, an AP MLD may use two links (i.e., an AP 1 and an AP 4) out of five links as the anchored link. A non-AP MLD may use one anchored link by selecting a link 1 from the two links used as the anchored link. The remaining link of the non-AP MLD may be connected to a non-anchored link (link 2, link 3). That is, the non-AP MLD shall always monitor the link 1 to receive a beam and management frame.

According to an embodiment, a STA 1 may request to switch the previously used anchored link to an anchored link of the AP 4, not the AP 1, for a reason such as load balancing or the like. An embodiment for the aforementioned link switching may be applied for switching of the anchored link.

However, the anchored link is limitedly supported, as some of the links supported by the AP MLD. Therefore, the AP MLD may have a separate anchored link list. The non-AP MLD (or STA) shall select one of links included in the anchored link list and request for switching or reconnection. In addition, since the non-AP MLD shall have at least one anchored link, when link switching or reconnection is requested, switching of the anchored link shall be requested by considering this.

For the aforementioned embodiment, the AP MLD shall additionally provide "anchored link list" information to the non-AP MLD. This may be included in a frame in the form of a new element or field. The term "anchored link list" is for exemplary purposes, and may be configured/expressed in various ways.

"Anchored Link List" (element/field): List information of an anchored link currently supported by an AP MLD. For example, the list information of the anchored link currently supported by the AP MLD may be indicated/configured as one or more link IDs or AP BSS values. A non-AP MLD shall be connected to at least one anchored link among links included in the list.

The aforementioned information (e.g., "anchored link list" (element/field)) may be transmitted to the non-AP MLD by being included in the existing beacon or management frame or, in case of the aforementioned solicited method, by being included together in an Info response message.

Therefore, when the non-AP MLD requests to switch the anchored link used by the non-AP MLD, the non-AP MLD shall know information on the currently supported anchored link list. If the anchored link list information is not known or the latest information is desired to be obtained, it may be obtained from the AP MLD by using the solicited method.

Only one link in the anchored link list may be requested for switching or reconnection by the STA, based on the anchored link list information. If another link not included in the list is requested for switching or reconnection, the AP MLD may transmit a decline message to the STA.

In case of the anchored link switching or reconnection, there are issues to be additional considered in addition to the existing link switching method. There are two cases where the STA of the non-AP MLD switches the anchored link.

In a first case, a STA which has already been connected to the anchored link switches to another anchored link of the AP MLD due to load balancing or the like (AP switching for the anchored link). In a second case, a STA connected to an anchored link is disabled due to a power state or the like, and thus another STA of the non-AP MLD is reconnected to the anchored link (STA switching for the anchored link).

The first case may operate identically/similarly to an embodiment for the aforementioned link switching and reconnection. However, when the STA reselects a link, the link shall be selected from among links of the anchored link list supported by the AP MLD. If another link is selected, the AP MLD may transmit a decline response message.

In the second case, issues to be additionally considered are necessary. An example for the second case may be described with reference to FIG. 34.

Figure 34:
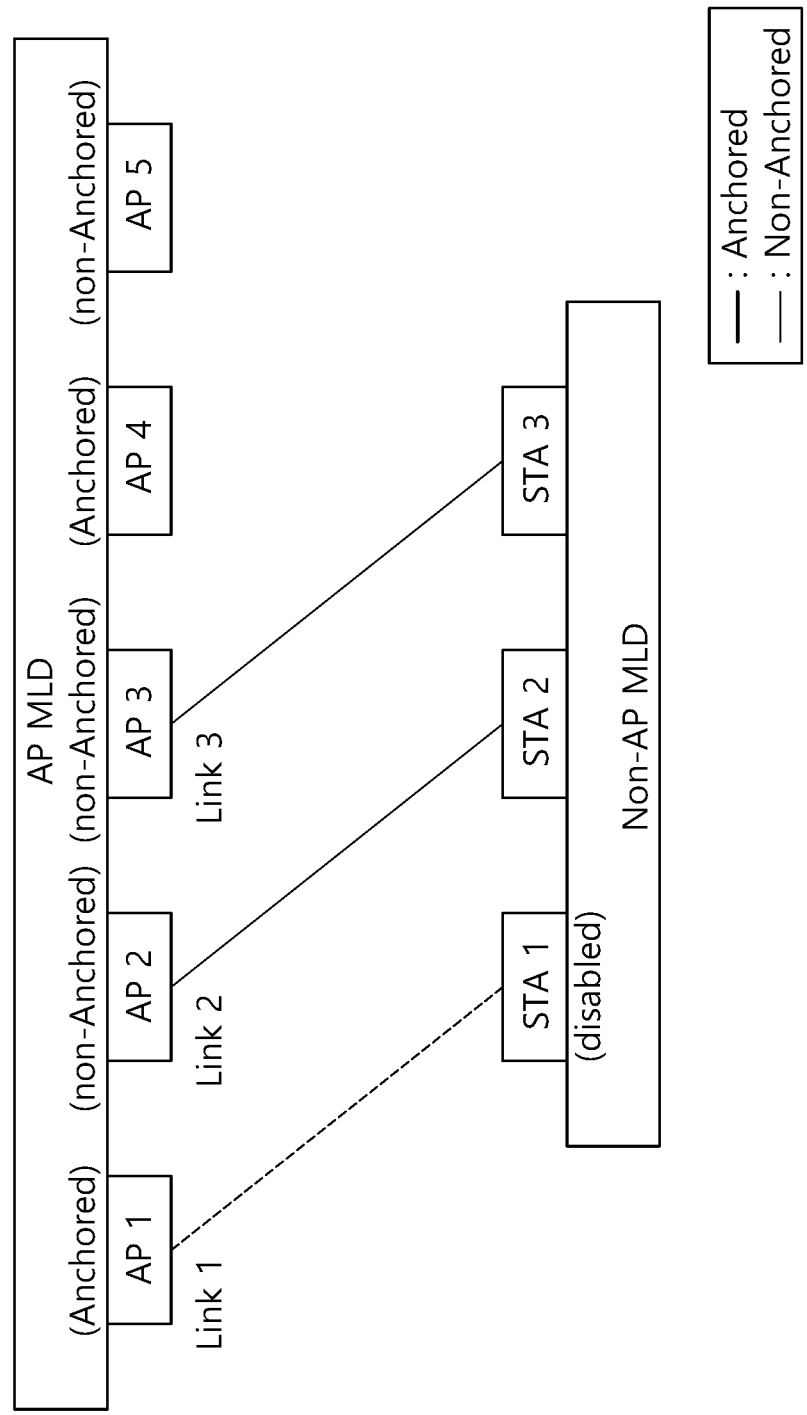
FIG. 34 illustrates an example of a situation in which there is a need for anchored link switching or reconnection.

FIG. 34 illustrates an example of a situation in which there is a need for anchored link switching or reconnection.

Referring to FIG. 34, regarding a STA of a non-AP MLD, a state of a STA 1 may be disabled for various reasons (e.g., power off, etc.). In this case, since both a STA 2 and a STA 3 are currently connected to a non-anchored link, one of the two STAs shall be reconnected to an anchored link.

As shown in FIG. 34, when the non-AP MLD shall reconnect the anchored link, the non-AP MLD may attempt to reconnect one of the STA 2 and the STA 3 to the anchored link.

For example, when the non-AP MLD knows information on an anchored link list supported by an AP MLD, the non-AP MLD may request for link switching by selecting a suitable link.

As another example, when the non-AP MLD does not have information on the anchored link list supported by the AP MLD, the non-AP MLD may request the AP MLD to switch a link by selecting a suitable link after obtaining information through an Info request.

An example of a specific operation of an AP MLD and non-AP MLD according to the aforementioned embodiment may be described with reference to FIG. 35.

Figure 35:
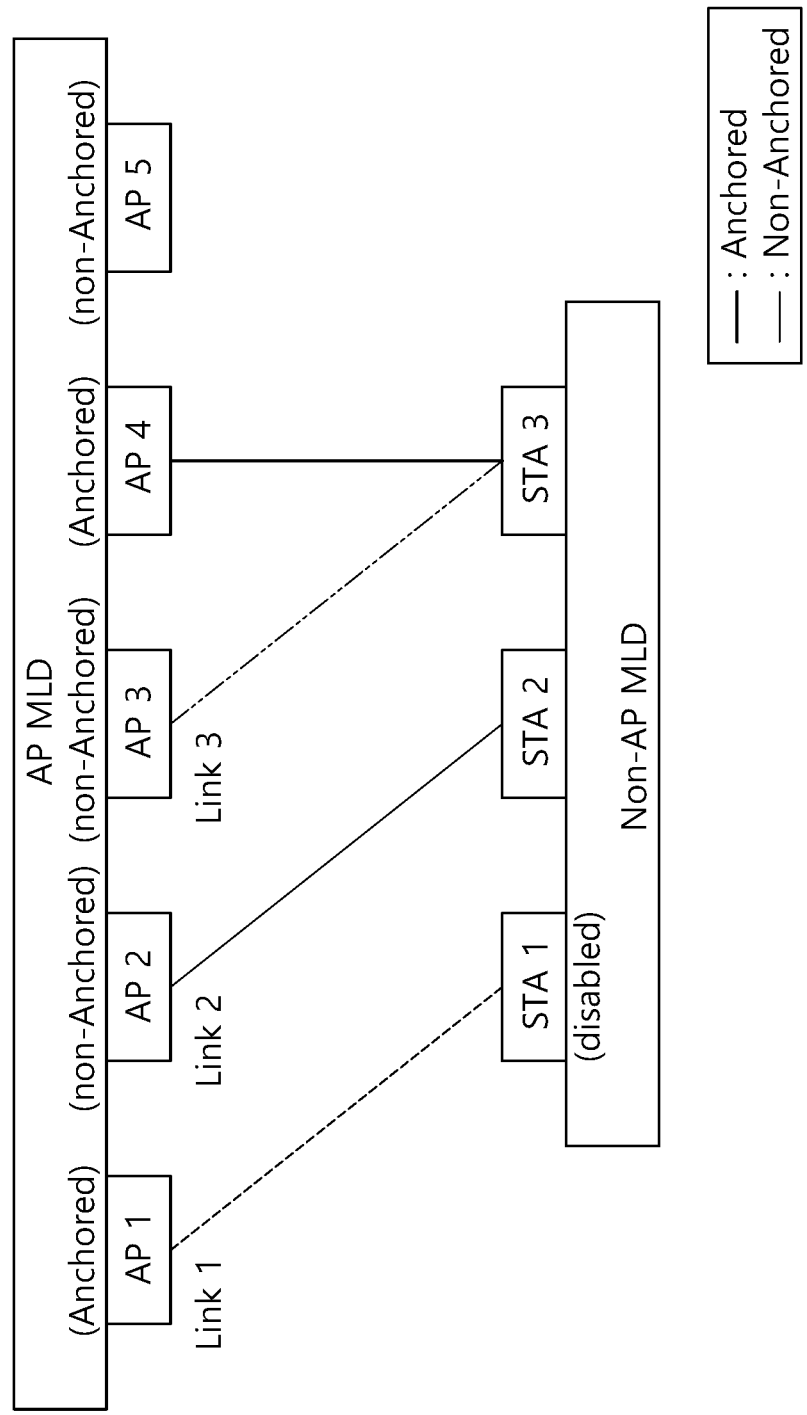
FIG. 35 illustrates an operation of an AP MLD and non-AP MLD for anchored link switching and reconnection.

FIG. 35 illustrates an operation of an AP MLD and non-AP MLD for anchored link switching and reconnection.

Referring to FIG. 35, when a STA 1 which has been connected to an anchored link is disabled, the non-AP MLD requires a new anchored link connection. In this case, the non-AP MLD may disconnect a non-anchored link with an AP 3, and may attempt to reconnect the anchored link.

For example, a STA 3 may attempt to connect to an AP 1 which has been previously used as the anchored link. As another example, the STA 3 may attempt to connect to a new AP 4, based on a variety of information.

A process of selecting a new anchored link may be performed identically/similarly to an embodiment for the aforementioned link switching and reconnection. For example, the STA 3 may select an anchored link recommended from the AP or directly select the anchored link to request for the reconnection. After the anchored link reconnection is complete, a link of the STA 3 may operate as the anchored link.

Element/Field Including Information on Anchored Link

According to an embodiment, when information on an anchored link supported by an AP MLD is changed or when a STA directly requests for the information on the anchored link, the AP MLD may transmit the information (e.g., information on the switched anchored link or information on the anchored link requested from the STA) to a non-AP MLD.

For example, the information may be transmitted by being included in a beacon frame as information on an anchored link currently in use, or may be transmitted by being included in a separate management frame.

The information on the anchored link may include the aforementioned "anchored link list" element indicating the anchored link supported by the AP MLD and information on whether the anchored link is used for each STA of the non-AP MLD.

Hereinafter, new elements including information on the aforementioned anchored link may be proposed. The newly proposed elements may be configured/determined as follows.

1) "Anchored Link Indication" element (or field): The "anchored link indication" element may include information on whether an anchored link is used for every STA connected to an AP MLD. That is, the "anchored link indication" element may be an element/field which indicates whether an anchored link is used for each link or STA of the non-AP MLD.

2) "STA ratio per Anchored Link" element (or field): The "STA ratio per anchored link" element may include information on a ratio or the number of STAs connected for each anchored link. However, only a STA which uses a link as an anchored link may be considered. In other words, even if the AP MLD supports a first link as the anchored link, a STA which uses the first link as a non-anchored link may not be included in the STA connected for each anchored link.

According to an embodiment, the elements may be optionally included in a frame as additional information, in all processes of an embodiment for the aforementioned anchored link switching or reconnection.

A specific example of the aforementioned elements may be described with reference to FIG. 36.

Figure 36:
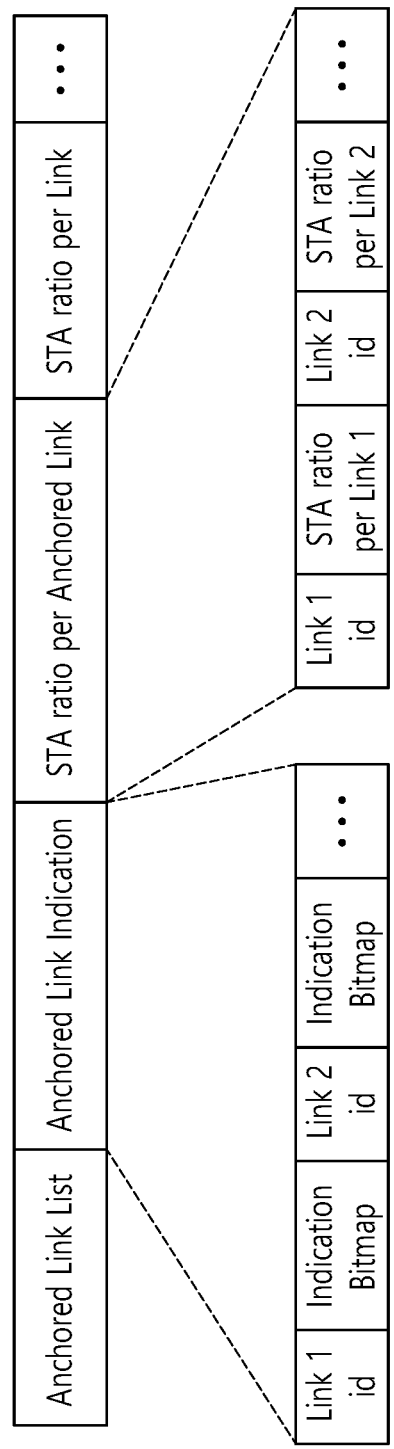
FIG. 36 and FIG. 37 illustrate a specific example of an element for anchored link reconnection.
Figure 37:
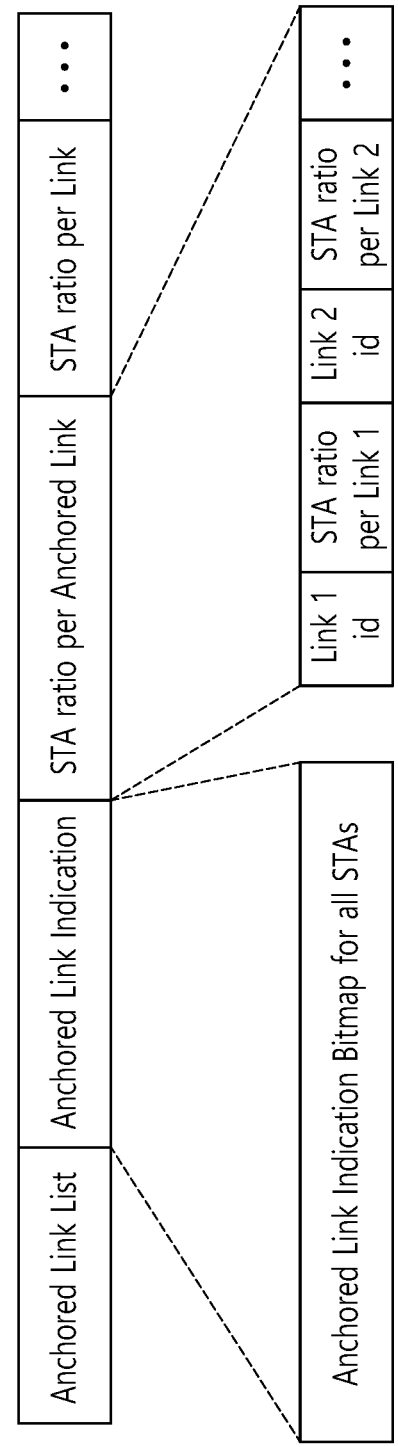

FIG. 36 and FIG. 37 illustrate a specific example of an element for anchored link reconnection.

Referring to FIG. 36 and FIG. 37, information on an anchored link may be transmitted through an anchored link list element (or field), an anchored link indication element (or field), and/or a STA ratio per anchored link element (or field). In other words, an element for anchored link reconnection may include an anchored link list element (or field), an anchored link indication element (or field), and/or a STA ratio per anchored link element (or field).

According to an embodiment, the anchored link list element may include information on a link list currently supported by an AP MLD, as described above. For example, the information on the link list currently supported by the AP MLD may be indicated based on a link ID, AP BSS information, or the like. In other words, the link list currently supported by the AP MLD may be configured/determined based on the link ID or the AP BSS information.

According to an embodiment, an anchored link indication element may include information on whether an anchored link is used for each STA of a non-AP MLD. For example, information on whether the anchored link is used for each STA of the non-AP MLD may be indicated/expressed through an indication bitmap for each link (FIG. 36). As another example, whether the anchored link is used for all STAs may be indicated/expressed through one bitmap (FIG. 37).

For example, when information on whether the anchored link is used is indicated by an indication bitmap based on a link ID, the STA may identify a current anchored link, based on a value of the anchored link list element. Therefore, the STA may identify a ratio of STAs connected to each anchored link. In this case, an indication bitmap field for the non-anchored link may be omitted to reduce an overhead.

When a value of a single bit in the bitmap is 1, the single bit may mean that a link currently connected to the STA is an anchored link. When the value of the single bit in the bitmap is 0, the single bit may mean that the link currently connected to the STA is a non-anchored link. An embodiment in which the bitmap is used to indicate whether the anchored link is connected for each STA is for exemplary purposes, and the information on whether the anchored link is connected for each STA may be transmitted through various embodiments.

According to an embodiment, a STA ratio may be transmitted for all links supported by the AP MLD. According to an embodiment, a STA ratio per anchored link element may include information on a usage ratio or count, as an actual anchored link of a STA for each anchored link. For example, the information is indicated only for an anchored link indicated/expressed in the anchored link list element, thereby having an advantage in reducing an overhead.

An example of setting a value of STA ratio per anchored link element may be described below.

For example, the AP MLD may include five APs (i.e., the AP 1 to the AP 5), and the AP 1 may be connected to STAs through the link 1. The AP 2 may be connected to the STAs through the link 2. The AP 3 may be connected to the STAs through the link 3. The AP 4 may be connected to the STAs through the link 4. The AP 5 may be connected to the STAs through the link 5.

The AP MLD may support two links out of five links (i.e., the link 1 to the link 5) as the anchored link. The link 1 and the link 4 may be supported/used as the anchored link.

A total of 10 STAs are connected to the link 1 (or the AP 1). The number of STAs which use the link 1 as the anchored link may be 7. To represent this as a ratio, it may be represented/indicated as 70%, and to represent this as a value, it may be represented/indicated as 7.

A total of 20 STAs are connected to the link 4 (or the AP 4). The number of STAs which use the link 4 as the anchored link may be 5. To represent this as a ratio, it may be represented/indicated as 25%, and to represent this as a value, it may be represented/indicated as 5.

The STA ratio per anchored link element is transmitted together with the aforementioned STA ratio per link element information, thereby transmitting more accurate information to the STA. In general, since the anchored link may have a relatively great amount of traffic compared to a non-anchored link, the STA ratio per anchored link element may be used as useful information for a STA which reselects the anchored link.

Based on the aforementioned information (or elements), the non-AP MLD may identify whether a link to which the non-AP MLD is connected is an anchored link, and may also identify a connection ratio of STAs for each anchored link, and a ratio by which the anchored link is used actually.

In addition, when the AP MLD transmits information of all links, i.e., other links, through the aforementioned elements, the STA may identify a connection ratio for each STA with respect to all anchored links of the AP MLD and an actual usage ratio, based on one frame. Therefore, the aforementioned information (or elements) may be utilized when selecting an anchored link to be used by the STA.

According to an embodiment for switching or reselecting an anchored link, the anchored link can be switched or reconnected more suitably by using not only a variety of link information (e.g., BSS load information for each AP, STR capability information for each link, etc.) used in the embodiment for link switching or reselection but also the aforementioned information (e.g., anchored link list information, information indicating whether the anchored link is used for each STA, or information on actual STA usage ratio for each anchored link, etc.) on the anchored link.

Figure 38:
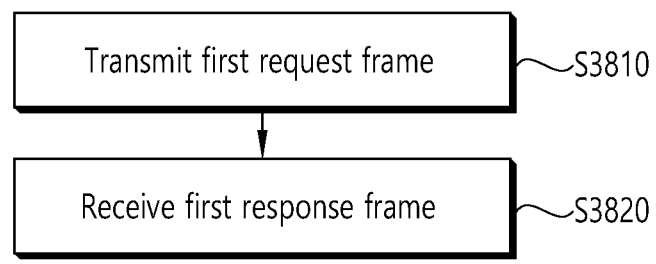
FIG. 38 is a flowchart for describing an operation of an MLD.

FIG. 38 is a flowchart for describing an operation of an MLD.

Referring to FIG. 38, in step S3810, the MLD may transmit a first request frame. According to an embodiment, the MLD may transmit the first request frame to request for information on a plurality of links. For example, the plurality of links may be included in 2.4 GHz, 5 GHz, and 6 GHz bands.

For example, the MLD may be connected to an AP MLD through the plurality of links. The MLD may include a plurality of STAs for the plurality of links. For example, among the plurality of STAs, a first STA may be connected to a first link.

According to an embodiment, the MLD may use/configure at least one link among the plurality of links as an anchored link. For example, the MLD may use/configure the first link as the anchored link. The anchored link may be used for management frame exchange and data transmission/reception. The non-anchored link may be used only for data transmission/reception.

The MLD may transmit a first request frame to request for information on the plurality of links. For example, the information on the plurality of links may include information required to switch an anchored link.

For example, the MLD may identify that the first link used as the anchored link is unreliable or is connected unreliably or is disconnected. Therefore, the MLD may transmit the first request frame to an AP MLD to request for the information on the plurality of links.

In step S3820, the MLD may receive a first response frame. According to an embodiment, the MLD may receive the first response frame, based on the first request frame.

According to an embodiment, the first response frame may include information on the first link and second link operable as the anchored link among the plurality of links. The first link and the second link may be configured to operate as the anchored link.

STAs connected to the first link may use the first link as the anchored link. However, not all of the STAs connected to the first link use the first link as the anchored link, and some of the STAs connected to the first link may use the first link as a non-anchored link. For example, the MLD may use the first link as the anchored link.

In addition, STAs connected to the second link may use the second link as the anchored link. However, not all of the STAs connected to the second link use the second link as the anchored link, and some of the STAs connected to the second link may use the second link as the non-anchored link. For example, the MLD may use the second link as the non-anchored link. As another example, the MLD may not be connected to the second link.

For example, the information on the first link and second link operable as the anchored link among the plurality of links may be configured as a bitmap. For example, a first bit for the first link included in the bitmap and a second bit for the second link included in the bitmap may be set to a first value. As another example, a third bit, included in the bitmap, for a link not operating as the anchored link may be set to a second value.

The MLD may identify that the first link is operable as the anchored link, based on that the first bit is the first value. The MLD may identify that the second link is operable as the anchored link, based on that the second bit is the first value.

According to an embodiment, information on the first link and second link operable as an anchored link among the plurality of links may include information on an identifier (ID) of the first link and information on an ID of the second link.

According to an embodiment, the first response frame may include information on a ratio of STAs which use the first link as the anchored link and information on a ratio of STAs which use the second link as the anchored link.

For example, the information on the ratio of the STAs connected to the first link may include information on a ratio of the number of STAs which use the first link as the anchored link against the number of the STAs connected to the first link. For example, if the number of STAs connected to the first link is 10 and the number of STAs which use the first link as the anchored link is 7, information on the ratio of STAs connected to the first link may be set to 70(%).

Likewise, the information on the ratio of STAs connected to the second link may include information on a ratio of the number of STAs which use the second link as the anchored link against the number of the STAs connected to the second link. For example, if the number of STAs connected to the second link is 20 and the number of STAs which use the second link as the anchored link is 5, information on the ratio of STAs connected to the second link may be set to 25(%).

According to an embodiment, the MLD may transmit a second request frame for switching the anchored link from the first link to the second link, based on the first response frame. For example, the MLD may transmit the second request frame for switching the anchored link from the first link to the second link, based on information included in the first response frame.

The MLD may receive a second response frame, based on the second request frame. For example, the MLD may receive the second response frame from the AP MLD. The second response frame may include information on whether the switching of the anchored link is accepted or declined.

The MLD may perform a process for switching the anchored link from the first link to the second link, based on the second response frame. For example, the MLD may disconnect a link operating as the non-anchored link and establish a connection with the second link. As another example, the MLD may disconnect the first link operating as the anchored link and establish a connection with the second link. As another example, when the MLD has already been connected to the second link operating as the non-anchored link, the MLD may switch the second link as the anchored link.

Figure 39:
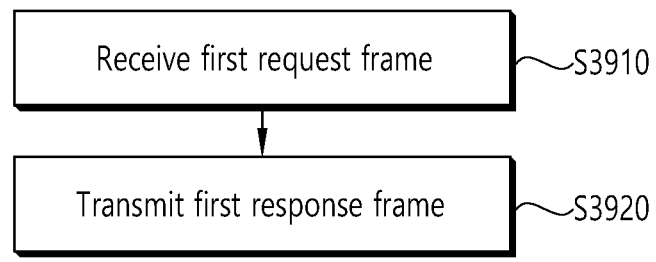
FIG. 39 is a flowchart for describing an operation of an AP MLD.

FIG. 39 is a flowchart for describing an operation of an AP MLD.

Referring to FIG. 39, in step S3910, the AP MLD may receive a first request frame. According to an embodiment, the AP MLD may receive the first request frame to request for information on a plurality of links. For example, the plurality of links may be included in 2.4 GHz, 5 GHz, and 6 GHz bands.

For example, the AP MLD may be connected to an MLD through the plurality of links. The AP MLD may include a plurality of APs for the plurality of links. For example, among the plurality of APs, a first AP may be connected to a first link.

According to an embodiment, the AP MLD may use/configure at least one link among the plurality of links as an anchored link. For example, the AP MLD may use/configure the first link and a second link as the anchored link. The anchored link may be used for management frame exchange and data transmission/reception. The non-anchored link may be used only for data transmission/reception.

For example, the anchored link configured in the AP MLD may be different from the anchored link configured in the MLD.

STAs connected to the first link may use the first link as the anchored link. However, not all of the STAs connected to the first link use the first link as the anchored link, and some of the STAs connected to the first link may use the first link as a non-anchored link. For example, the MLD may use the first link as the anchored link.

In addition, STAs connected to the second link may use the second link as the anchored link. However, not all of the STAs connected to the second link use the second link as the anchored link, and some of the STAs connected to the second link may use the second link as the non-anchored link. For example, the MLD may use the second link as the non-anchored link.

As described above, even when the AP MLD uses/configures the first link and the second link as the anchored link, the MLD may use at least one of the first link and the second link as the anchored link. Therefore, the anchored link configured/used in the MLD may be configured as some or all of anchored links configured/used in the AP MLD.

In step S3920, the AP MLD may transmit a first response frame. According to an embodiment, the AP MLD may transmit the first response frame, based on the first request frame.

According to an embodiment, the first response frame may include information on the first link and second link operable as the anchored link among the plurality of links. The first link and the second link may be configured to operate as the anchored link.

For example, the information on the first link and second link operable as the anchored link among the plurality of links may be configured as a bitmap. For example, a first bit for the first link included in the bitmap and a second bit for the second link included in the bitmap may be set to a first value. As another example, a third bit, included in the bitmap, for a link not operating as the anchored link may be set to a second value.

According to an embodiment, information on the first link and second link operable as an anchored link among the plurality of links may include information on an identifier (ID) of the first link and information on an ID of the second link.

According to an embodiment, the first response frame may include information on a ratio of STAs which use the first link as the anchored link and information on a ratio of STAs which use the second link as the anchored link.

For example, the information on the ratio of the STAs connected to the first link may include information on a ratio of the number of STAs which use the first link as the anchored link against the number of the STAs connected to the first link. For example, if the number of STAs connected to the first link is 10 and the number of STAs which use the first link as the anchored link is 7, information on the ratio of STAs connected to the first link may be set to 70(%).

Likewise, the information on the ratio of STAs connected to the second link may include information on a ratio of the number of STAs which use the second link as the anchored link against the number of the STAs connected to the second link. For example, if the number of STAs connected to the second link is 20 and the number of STAs which use the second link as the anchored link is 5, information on the ratio of STAs connected to the second link may be set to 25(%).

The aforementioned technical feature of the present specification may be applied to various apparatuses and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, an apparatus of the present specification may include a processor and a memory connected to the processor. The processor may be configured to: transmit a first request frame to request for information on the plurality of links, and receive a first response frame, based on the first request frame. The first response frame may include information on a first link and second link operable as an anchored link among the plurality of links. The first response frame may further include information on a ratio of stations (STAs) which use the first link as the anchored link and information on a ratio of STAs which use the second link as the anchored link.

The technical feature of the present specification may be implemented based on a computer readable medium (CRM). For example, the CRM proposed in the present specification may be encoded with at least one computer program including instructions. The instruction, when executed by at least one processor, may cause the at least one processor to perform operations including: transmitting a first request frame to request for information on the plurality of links; and receiving a first response frame, based on the first request frame. The first response frame may include information on a first link and second link operable as an anchored link among the plurality of links. The first response frame may further include information on a ratio of STAs which use the first link as the anchored link and information on a ratio of STAs which use the second link as the anchored link. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a multi-link device (MLD) operating on a plurality of links in a wireless local area network (WLAN) system, the method comprising:
    transmitting a first request frame to request for information on the plurality of links; and
    receiving a first response frame, based on the first request frame,
    wherein the first response frame includes information on a first link and second link operable as an anchored link among the plurality of links, and
    wherein the first response frame further includes information on a ratio of stations (STAs) which use the first link as the anchored link and information on a ratio of STAs which use the second link as the anchored link.

2. The method of claim 1,
    wherein the MLD is connected to an access point (AP) MLD through the first link,
    wherein the first link is used as the anchored link in the MLD, and
    wherein the second link is used as a non-anchored link in the MLD.

3. The method of claim 2, further comprising:
    transmitting a second request frame for switching the anchored link from the first link to the second link;
    receiving a second response frame, based on the second request frame; and
    performing a process for switching the anchored link from the first link to the second link, based on the second response frame.

4. The method of claim 1,
    wherein information on a ratio of STAs connected to the first link includes information on a ratio of the number of STAs which use the first link as the anchored link against the number of the STAs connected to the first link, and
    wherein information on a ratio of STAs connected to the second link includes information on a ratio of the number of STAs which use the second link as the anchored link against the number of the STAs connected to the second link.

5. The method of claim 1,
    wherein the information on the first link and second link operable as the anchored link among the plurality of links is configured as a bitmap, and
    wherein a first bit for the first link included in the bitmap and a second bit for the second link included in the bitmap are set to a first value.

6. The method of claim 5, wherein a third bit, included in the bitmap, for a link not operating as the anchored link is set to a second value.

7. The method of claim 1, wherein information on the first link and second link operable as the anchored link among the plurality of links includes information on an identifier (ID) of the first link and information on an ID of the second link.

8. The method of claim 1, wherein the anchored link is used to exchange a management frame.

9. The method of claim 1, wherein the plurality of links are included in 2.4 GHz, 5 GHZ, and 6 GHz bands.

10. A method performed by an access point (AP) multi-link device (MLD) operating on a plurality of links in a wireless local area network (WLAN) system, the method comprising:
    receiving a first request frame to request for information on the plurality of links; and
    transmitting a first response frame, based on the first request frame,
    wherein the first response frame includes information on a first link and second link operable as an anchored link among the plurality of links, and
    wherein the first response frame further includes information on a ratio of stations (STAs) which use the first link as the anchored link and information on a ratio of STAs which use the second link as the anchored link.

11. A multi-link device (MLD) operating on a plurality of links in a wireless local area network (WLAN) system, the MLD comprising:
    a transceiver transmitting and receiving a radio signal; and
    a processor connected to the transceiver, wherein the processor is configured to:
    transmit a first request frame to request for information on the plurality of links; and
    receive a first response frame for the plurality of links, based on the first request frame,
    wherein the first response frame includes information on a first link and second link operable as an anchored link among the plurality of links, and
    wherein the first response frame further includes information on a ratio of stations (STAs) which use the first link as the anchored link and information on a ratio of STAs which use the second link as the anchored link.

12. The MLD of claim 11,
wherein the MLD is connected to an access point (AP) MLD through the first link, and
wherein the first link is used as the anchored link in the MLD.

13. The MLD of claim 12, wherein the processor is configured to:
transmit a second request frame for switching the anchored link from the first link to the second link;
receive a second response frame, based on the second request frame; and
perform a process for switching the anchored link from the first link to the second link, based on the second response frame.

14. The MLD of claim 11,
wherein information on a ratio of STAs connected to the first link includes information on a ratio of the number of STAs which use the first link as the anchored link against the number of the STAs connected to the first link, and
wherein information on a ratio of STAs connected to the second link includes information on a ratio of the number of STAs which use the second link as the anchored link against the number of the STAs connected to the second link.

15. The MLD of claim 11,
wherein the information on the first link and second link operable as the anchored link among the plurality of links is configured as a bitmap, and
wherein a first bit for the first link included in the bitmap and a second bit for the second link included in the bitmap are set to a first value.

16. The MLD of claim 15, wherein a third bit, included in the bitmap, for a link not operating as the anchored link is set to a second value.

17. The MLD of claim 11, wherein the anchored link is used to exchange a management frame.

* * * * *